(12) United States Patent
Lee et al.

(10) Patent No.: US 6,952,478 B2
(45) Date of Patent: Oct. 4, 2005

(54) METHOD AND SYSTEM FOR PERFORMING PERMUTATIONS USING PERMUTATION INSTRUCTIONS BASED ON MODIFIED OMEGA AND FLIP STAGES

(75) Inventors: Ruby B. Lee, Princeton, NJ (US); Xiao Yang, Princeton, NJ (US)

(73) Assignee: Teleputers, LLC, Princeton, NJ (US)

( * ) Notice: Subject to any disclaimer, the term of this patent is extended or adjusted under 35 U.S.C. 154(b) by 842 days.

(21) Appl. No.: 09/850,238

(22) Filed: May 7, 2001

(65) Prior Publication Data

US 2002/0108030 A1 Aug. 8, 2002

Related U.S. Application Data

(60) Provisional application No. 60/202,243, filed on May 5, 2000.

(51) Int. Cl.$^7$ .............................. H04K 1/04; H04K 1/06
(52) U.S. Cl. ............................... 380/37; 380/28; 380/1; 380/26
(58) Field of Search ............................... 380/37, 28, 1, 380/26

(56) References Cited

U.S. PATENT DOCUMENTS

| | | | |
|---|---|---|---|
| 3,796,830 A | | 3/1974 | Smith |
| 3,962,539 A | | 6/1976 | Ehrsam et al. |
| 4,275,265 A | | 6/1981 | Davida et al. |
| 4,972,481 A | | 11/1990 | Santesson |
| 5,001,753 A | | 3/1991 | Davio et al. |
| 5,483,541 A | | 1/1996 | Linsky |
| 5,495,476 A | * | 2/1996 | Kumar ....................... 370/388 |
| 5,546,393 A | * | 8/1996 | Minc ........................ 370/230.1 |
| 5,673,321 A | | 9/1997 | Lee |
| 5,768,493 A | | 6/1998 | Kumar |
| 5,956,405 A | | 9/1999 | Yuval |
| 6,081,896 A | | 6/2000 | Johns-Vano et al. |
| 6,119,224 A | | 9/2000 | Roth |
| 6,195,026 B1 | | 2/2001 | Acharya |
| 6,275,587 B1 | | 8/2001 | Amerige |
| 6,381,690 B1 | * | 4/2002 | Lee ............................ 712/223 |
| 6,446,198 B1 | * | 9/2002 | Sazegari .................... 712/300 |
| 6,629,115 B1 | * | 9/2003 | Rossignol ................... 708/209 |

OTHER PUBLICATIONS

Advanced Encryption Standard, "Announcing Request for Candidate Algorithm Nominations for the Advanced Encryption Standard (AES)," http://csrc.nist.gov/encryption/aes/pre-round1/aes_9709.htm.

* cited by examiner

*Primary Examiner*—Thomas R. Peeso
*Assistant Examiner*—Grigory Gurshman
(74) *Attorney, Agent, or Firm*—Mathews, Collins, Shepherd & McKay, P.A.

(57) ABSTRACT

The present invention provides permutation instructions which can be used in software executed in a programmable processor for solving permutation problems in cryptography, multimedia and other applications. The permute instructions are based on an omega-flip network comprising at least two stages in which each stage can perform the function of either an omega network stage or a flip network stage. Intermediate sequences of bits are defined that an initial sequence of bits from a source register are transformed into. Each intermediate sequence of bits is used as input to a subsequent permutation instruction. Permutation instructions are determined for permuting the initial source sequence of bits into one or more intermediate sequence of bits until a desired sequence is obtained. The intermediate sequences of bits are determined by configuration bits. The permutation instructions form a permutation instruction sequence, of at least one instruction. At most 21 gr/m permutation instructions are used in the permutation instruction sequence, where r is the number of k-bit subwords to be permuted, and m is the number of network stages executed in one instruction. The permutation instructions can be used to permute k-bit subwords packed into an n-bit word, where k can be 1, 2, . . . , or n bits, and k*r=n.

70 Claims, 18 Drawing Sheets

METHOD AND SYSTEM FOR PERFORMING PERMUTATIONS USING PERMUTATION INSTRUCTIONS BASED ON MODIFIED OMEGA AND FLIP STAGES

Application claims benefit of a provisional application No. 60/202,243 filed as May 5, 2000.

BACKGROUND OF THE INVENTION

1. Field of the Invention

The present invention relates to a method and system for performing arbitrary permutations of a sequence of bits in a programmable processor by determining a permutation instruction based on omega and flip networks.

2. Description of the Related Art

The need for secure information processing has increased with the increasing use of the public internet and wireless communications in e-commerce, e-business and personal use. Typical use of the internet is not secure. Secure information processing typically includes authentication of users and host machines, confidentiality of messages sent over public networks, and assurances that messages, programs and data have not been maliciously changed. Conventional solutions have provided security functions by using different security protocols employing different cryptographic algorithms, such as public key, symmetric key and hash algorithms.

For encrypting large amounts of data, symmetric key cryptography algorithms have been used, see Bruce Schneier, "Applied Cryptography", 2nd Ed., John Wiley & Sons, Inc., 1996. These algorithms use the same secret key to encrypt and decrypt a given message, and encryption and decryption have the same computational complexity. In symmetric key algorithms, the cryptographic techniques of "confusion" and "diffusion" are synergistically employed. "Confusion" obscures the relationship between the plaintext (original message) and the ciphertext (encrypted message), for example, through substitution of arbitrary bits for bits in the plaintext. "Diffusion" spreads the redundancy of the plaintext over the ciphertext, for example through permutation of the bits of the plaintext block. Such bit-level permutations have the drawback of being slow when implemented with conventional instructions available in microprocessors and other programmable processors.

Bit-level permutations are particularly difficult for processors, and have been avoided in the design of new cryptography algorithms, where it is desired to have fast software implementations, for example in the Advanced Encryption Standard, as described in NIST, "Announcing Request for Candidate Algorithm Nominations for the Advanced Encryption Standard (AES)", http://csrc.nist.gov/encryption/aes/pre-round1/aes 9709.htm, Since conventional microprocessors are word-oriented, performing bit-level permutations is difficult and tedious. Every bit has to be extracted from the source register, moved to its new location in the destination register, and combined with the bits that have already been moved. This requires 4 instructions per bit (mask generation, AND, SHIFT, OR), and 4n instructions to perform an arbitrary permutation of n bits. Conventional microprocessors, for example Precision Architecture (PA-RISC) have been described to provide more powerful bit-manipulation capabilities using EXTRACT and DEPOSIT instructions, which can essentially perform the four operations required for each bit in 2 instructions (EXTRACT, DEPOSIT), resulting in 2n instructions for any arbitrary permutation of n bits, see Ruby Lee, "Precision Architecture", *IEEE Computer*, Vol. 22, No. 1, pp. 78–91, January 1989. Accordingly, an arbitrary 64-bit permutation could take 128 or 256 instructions on this type of conventional microprocessor. Pre-defined permutations with some regular patterns have been implemented in fewer instructions, for example, the permutations in DES, as described in Bruce Schneier, "Applied Cryptography", 2nd Ed., John Wiley & Sons, Inc., 1996.

Conventional techniques have also used table lookup methods to implement fixed permutations. To achieve a fixed permutation of n input bits with one table lookup, a table with $2^n$ entries is used with each entry being n bits. For a 64-bit permutation, this type of table lookup would use $2^{67}$ bytes, which is clearly infeasible. Alternatively, the table can be broken up into smaller tables, and several table lookup operations could be used. For example, a 64-bit permutation could be implemented by permuting 8 consecutive bits at a time, then combining these 8 intermediate permutations into a final permutation. This method requires 8 tables, each with 256 entries, each entry being 64 bits. Each entry has zeros in all positions, except the 8 bit positions to which the selected 8 bits in the source are permuted. After the eight table lookups done by 8 LOAD instructions, the results are combined with 7 OR instructions to get the final permutation. In addition, 8 instructions are needed to extract the index for the LOAD instruction, for a total of 23 instructions. The memory requirement is $8*256*8=16$ kilobytes for eight tables. Although 23 instructions is less than the 128 or 256 instructions used in the previous method, the actual execution time can be much longer due to cache miss penalties or memory access latencies. For example, if half of the 8 Load instructions miss in the cache, and each cache miss takes 50 cycles to fetch the missing cache line from main memory, the actual execution time is more than $4*50=200$ cycles. Accordingly, this method can be longer than the previously described 128 cycles using EXTRACT and DEPOSIT. This method also has the drawback of a memory requirement of 16 kilobytes for the tables.

Permutations are a requirement for fast processing of digital multimedia information, using subword-parallel instructions, more commonly known as multimedia instructions, as described in Ruby Lee, "Accelerating Multimedia with Enhanced Micro-processors", *IEEE Micro*, Vol. 15, No. 2, pp.22–32, April 1995, and Ruby Lee, "Subword Parallelism in MAX-2", *IEEE Micro*, Vol. 16, No. 4, pp.51–59, August 1996. Microprocessor Instruction Set Architecture (ISA) uses these subword parallel instructions for fast multimedia information processing. With subwords packed into 64-bit words, it is often necessary to rearrange the subwords within the word. However, such subword permutation instructions are not provided by many of the conventional multimedia ISA extensions.

A few microprocessor architectures have subword rearrangement instructions. MIX and PERMUTE instructions have been implemented in the MAX-2 extension to Precision Architecture RISC (PA-RISC) processor, see Ruby Lee, "Subword Parallelism in MAX-2", *IEEE Micro*, Vol. 16, No. 4, pp.51–59, August 1996. The MAX-2 general-purpose PERMUTE instruction can do any permutation, with and without repetitions, of the subwords packed in a register. However, it is only defined for 16-bit subwords. MIX and MUX instructions have been implemented in the IA-64 architectures, which are extensions to the MIX and PERMUTE instructions of MAX-2, see Intel Corporation, "IA-64 Application Developers' Architecture Guide", *Intel Corporation*, May 1999. The IA-64 uses MUX instruction, which is a fully general permute instruction for 16-bit subwords, with five new permute byte variants. A VPERM instruction has been used in an AltiVec extension to the Power PC™ available from IBM Corporation, Armonk, N.Y., see Motorola Corporation, "'AltiVec Extensions to PowerPC' Instruction Set Architecture Specification", Motorola Corporation, May 1998. The Altivec VPERM instruction extends the general permutation capabilities of MAX-2's PERMUTE instruction to 8-bit subwords selected from two 128-bit source registers, into a single 128-bit destination register. Since there are 32 such subwords from which 16 are selected, this requires 16*1 g32=80 bits for specifying the desired permutation. This means that VPERM has to use another 128-bit register to hold the permutation control bits, making it a very expensive instruction with three source registers and one destination register, all 128 bits wide.

It is desirable to provide significantly faster and more economical ways to perform arbitrary permutations of n bits, without any need for table storage, which can be used for encrypting large amounts of data for confidentiality or privacy.

SUMMARY OF THE INVENTION

The present invention provides permutation instructions which can be used in software executed in a programmable processor for solving permutation problems in both cryptography and multimedia. For fast cryptography, bit-level permutations are used, whereas for multimedia, permutations on subwords of typically 8 bits or 16 bits are used. Permutation instructions of the present invention can be used to provide any arbitrary permutation of sixty-four 1-bit subwords in a 64-bit processor, i.e., a processor with 64-bit words, registers and datapaths, for use in fast cryptography. The permutation instructions of the present invention can also be used for permuting subwords greater than 1 bit in size, for use in fast multimedia processing. For example, in addition to being able to permute sixty-four 1-bit subwords in a register, the permutation instructions and underlying functional unit can permute thirty-two 2-bit subwords, sixteen 4-bit subwords, eight 8-bit subwords, four 16-bit subwords, or two 32-bit subwords. The permutation instructions of the present invention can be added as new instructions to the Instruction Set Architecture of a conventional microprocessor, or they can be used in the design of new processors or coprocessors to be efficient for both cryptography and multimedia software.

The method for performing permutations is by constructing a virtual omega-flip interconnection network. This is done by executing stages of it with permutation instructions. The permutation instructions are performed by a circuit comprising at least two stages in which each stage is either a modified omega network stage or a modified flip network stage. Intermediate sequences of bits are defined that an initial sequence of bits from a source register are transformed into. Each intermediate sequence of bits is used as input to a subsequent permutation instruction. Permutation instructions are determined for permuting the initial source sequence of bits into one or more intermediate sequence of bits until a desired sequence is obtained. The intermediate sequences of bits are determined by configuration bits. The permutation instructions form a permutation instruction sequence. At most 1 gn permutation instructions are used in the permutation instruction sequence.

In an embodiment of the present invention, multibit subwords are permuted by eliminating pass-through stages in the omega-flip network. In a further embodiment of the invention, the method and system are scaled for performing permutations of 2n bits in which subwords are packed into two or more registers. In this embodiment, at most 41 gn+2 instructions are used to permute 2n bits using n-bit words.

For a better understanding of the present invention, reference may be made to the accompanying drawings.

DETAILED DESCRIPTION

Figure 1:
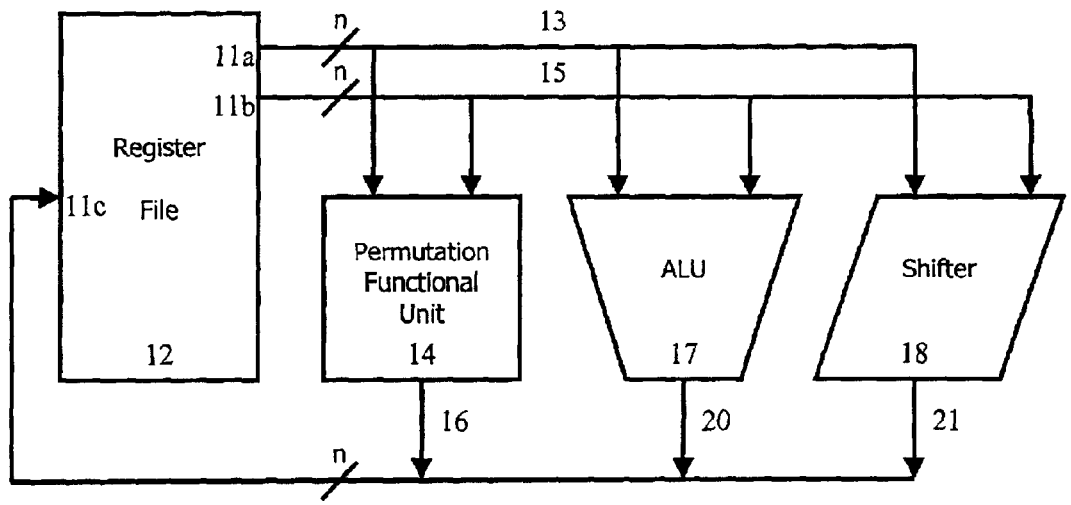
FIG. 1 is a schematic diagram of a system for implementing permutation instructions in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of a system for implementing efficient permutation instructions 10 in accordance with the teachings of the present invention. Register file 12 includes source register 11a, source register 11b and destination register 11c. System 10 can provide bit-level permutations of all n bits of any register in register file 12. The same solution can be applied to different subword sizes of $2^i$ bits, for i=0, 1, 2, . . . , m, where n=$2^m$ bits. For a fixed word size of n bits, and 1-bit subwords, there are n subwords to be permuted. Source register values to be permuted 13 from source register 11a and configuration bits 15 from source register 11b are applied over datapaths to permutation functional unit 14. Source register values to be permuted 13 can be a sequence of bits or a sequence of subwords. Permutation functional unit 14 generates permutation result 16. Permutation result 16 can be an intermediate result if additional permutations are performed by permutation functional unit 14. For other instructions, arithmetic logic unit (ALU) 17 and shifter 18 receive source register values 13 from source register 11a and source register values –15 from source register 11b and generate a respective ALU result 20 and a shifter result 21 over a datapath to destination register 11c. System 10 can be implemented in any programmable processor, for example, a conventional microprocessor, digital signal processor (DSP), cryptographic processor, multimedia processor, media processor, and can be used in developing processors or coprocessors for providing cryptography and multimedia operations.

Figure 2:
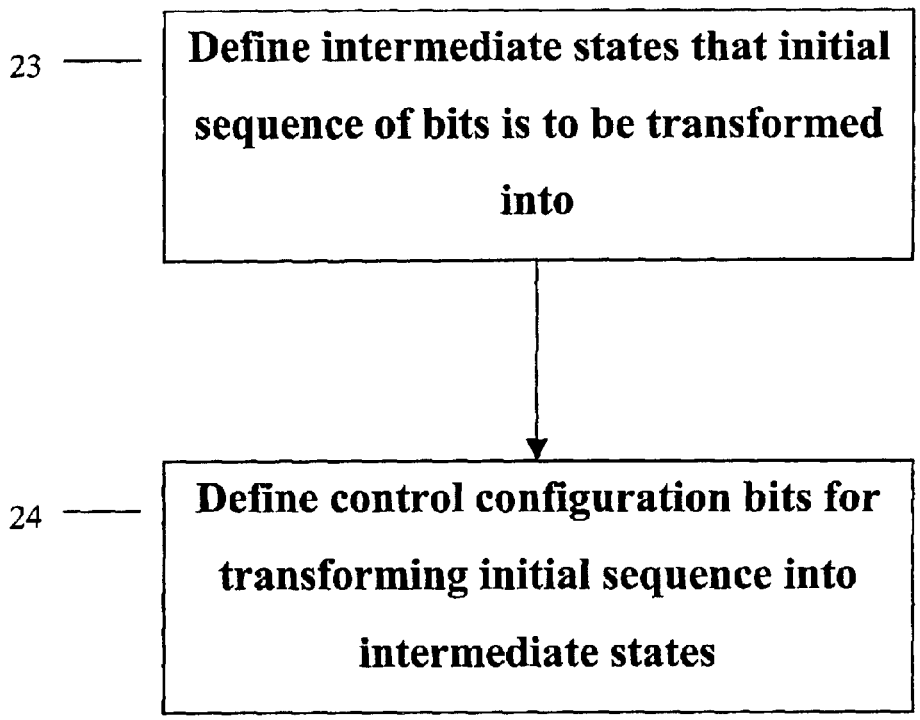
FIG. 2 is a flow diagram of a method for determining permutation instruction sequence to achieve a desired permutation in accordance with an embodiment of the present invention.

FIG. 2 is a flow diagram of a method of determining permutation instruction sequences for permutations 22. The determined permutation instruction sequences can be performed in permutation functional unit 14. In block 23, intermediate states are defined that an initial sequence of bits from a source register are to be transformed into. The final state is the desired permutation of the initial sequence of bits. In block 24, control configuration bits are defined for transforming the initial sequence into the first intermediate state and subsequent intermediate states until transformation into the final state.

A multi-stage interconnection network can be used to perform permutations of bits in a programmable processor. This can be achieved by performing the function of one or more stages of this interconnection network with a permutation instruction. A sequence of permutation instructions can be used to perform the functions of directing the n input bits to different output bit positions through non-conflicting nodes of the multi-stage interconnection network. In preferred embodiments of this invention, only two or four modified interconnection network stages need to be implemented by permutation functional unit 14 in FIG. 1, in order to achieve the functions of a full multi-stage interconnection network. For example, an omega network and a flip network can be used to define permutations of n bits using intermediate states. An omega network has uniform stages, such that each stage is identical. The flip network is a mirror image of the omega network as described in F. T. Leighton, "Introduction to Parallel Algorithms and Architectures: Arrays, Trees, Hypercubes, " Morgan-Kaufmann Publishers, Inc., San Mateo, Calif., 1992, hereby incorporated by reference into this application. An n-input omega network has 1 gn identical omega stages. An n-input flip network is the exact mirror image of an n-input omega network and has 1 gn identical flip stages.

Figure 3A:
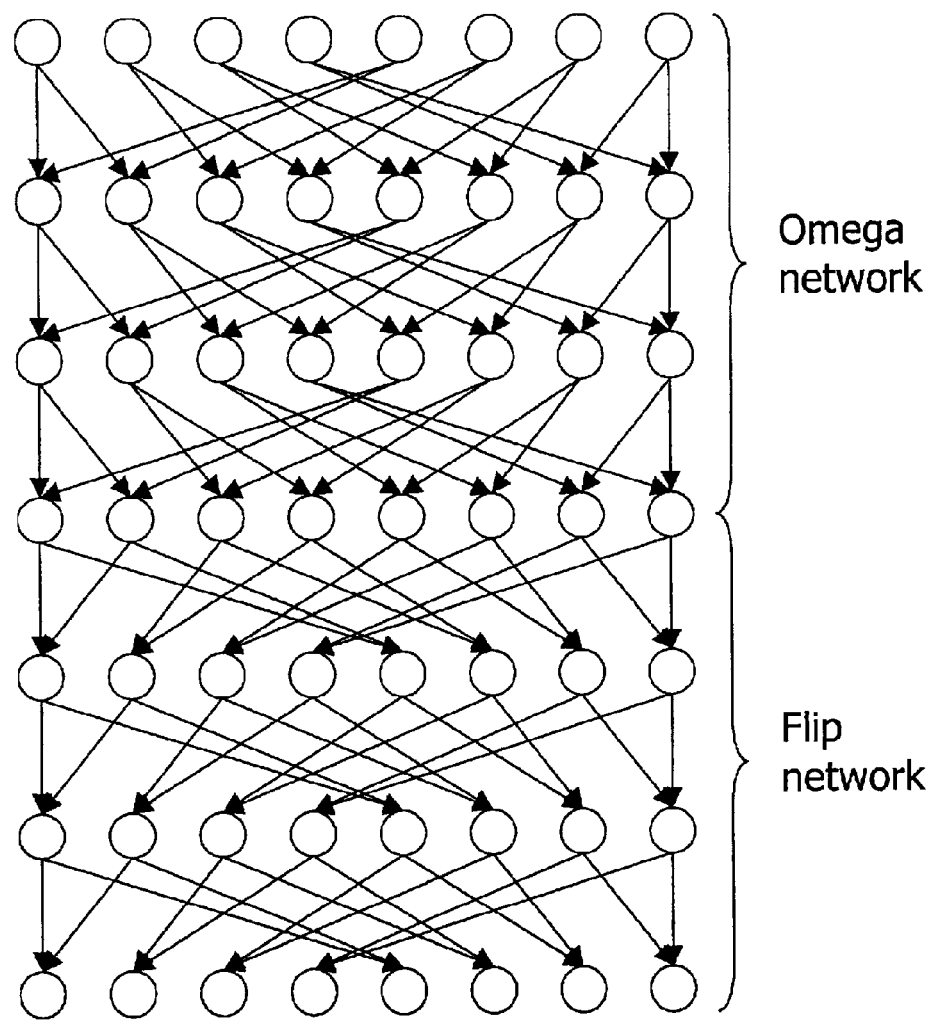
FIG. 3A is a schematic diagram of an 8-input omega-flip network.

The total number of stages in an n-input omega network or flip network is 1 gn and the number of nodes in each stage is n. A node is defined as a point in the network where the path selection for an input takes place. In each stage of an omega network or flip network, for every input, there is another input that shares the same two outputs with it. Such pairs of inputs can be referred to as "conflict inputs" and their corresponding outputs can be referred to as "conflict outputs". An omega-flip network is formed by connecting an n-input omega network and an n-input flip network. The outputs of the omega network are connected to the inputs of the flip network. A flip-omega network is formed by connecting an n-input flip network and an n-input omega network. The term "omega-flip network" is used to represent both cases, as well as a network where each stage can be either an omega stage or a flip stage or a pass-through stage. An example of an 8-input omega-flip network is shown in FIG. 3A. Omega-flip network 25 can be used to perform any permutation of its n=8 inputs with edge disjoint paths, i.e., no two paths share the same node.

In the implementation of method 22 in an omega-flip network, basic operations are defined as an omega operation and a flip operation. An omega operation is that done by one stage of an omega network. A flip operation is that done by one stage of a flip network. The omega operation and the flip operation each has two source operands: the source bits to be permuted and configuration bits for a specification of the configuration. Bits from the source register are moved to the destination register based on the configuration bits. For each of the omega and flip basic operations n/2 bits are used to specify the configuration for n input bits. Accordingly, for permuting the contents in an n-bit register, the n configuration bits for two basic operations can be packed into one configuration register for allowing two basic operations to be packed into a single instruction. In an embodiment of the present invention, if the configuration bit for a pair of conflict inputs is 0, the bits from the two conflict inputs go through non-crossing paths to the outputs. If the configuration bit for a pair of conflict inputs is 1, the bits from the two conflict inputs go through crossing paths to the outputs.

In a preferred embodiment of the invention, the instruction format for the permutation instruction can be defined as OMFLIP, c R1, R2, R3 wherein R1 is a reference to a source register which contains the subwords to be permuted, R2 is a reference to a configuration register that holds the configuration bits for the two basic operations, R3 is a reference to a destination register where the permuted subwords are placed, and c is a sub-opcode that indicates which two basic operations are used in the instruction. The subwords can be formed of one or more bits. R1, R2 and R3 refer to registers $R_i$, $R_j$ and $R_k$ where i, j and k can all be different or two or more of i, j and k can be the same. Alternatively, $R_3$ can be omitted and the permuted subwords are placed in register R1. For example, c can contain two bits. For each of the two bits, 0 indicates that an omega operation is used and 1 indicates that a flip operation is used. Accordingly, for example there can be four combinations of c: omega-omega, omega-flip, flip-omega and flip-flip. The first basic operation can be determined by the left bit of c. The first basic operation moves the bits in source register R1 based on the left half of the configuration bits held in the configuration in register R2 to an intermediate result. The second basic operation can be determined by the right bit of c. The second basic operation moves the bits in the intermediate result according to the right half of the configuration bits in the register R2 to the destination register R3. Pseudo code for the OMFLIP instruction is shown in Table 1.

TABLE 1

```
OMFLIP,c R1, R2, R3    for (i = 0; i < 2; i + +)
                          if (c[i] = = 0)
                             for (j = 0; j < n/2; j++)
                                R3 [2 * j] = R1 [j];
                                R3 [2 * j + 1] = R1 [j + n/2];
                                if (R2[j] = = 1)
                                   swap (R3 [2 * j], R3 [2 * j + 1]);
                          else
                             for (j = 0; j < n/2; j++)
                                R3 [j] = R1 [2 * j];
                                R3 [j + n/2] = R1 [2 * j + 1];
                                if (R2 [j + n/2] = = 1)
                                   swap (R3 [j], R3 [j + n/2]);
```

The OMFLIP instruction can be added to the Instruction Set Architecture of conventional microprocessors, digital signal processors (DSP), cryptographic processors, multimedia processors, media processors, programmable System-on-a-Chips (SOC), and can be used in developing processors or coprocessors for providing cryptography and multimedia operation. In particular, the OMFLIP instruction can permute sixty four 1-bit subwords in a 64-bit processor for use in, for example, encryption and decryption processing with software. The OMFLIP instruction can also permute multi-bit subwords as described below, for example, thirty-two 2-bit subwords, sixteen 4-bit subwords, eight 8-bit subwords, four 16-bit subwords or two 32-bit subwords in a 64-bit processor for use for example in multimedia processing.

Figure 3B:
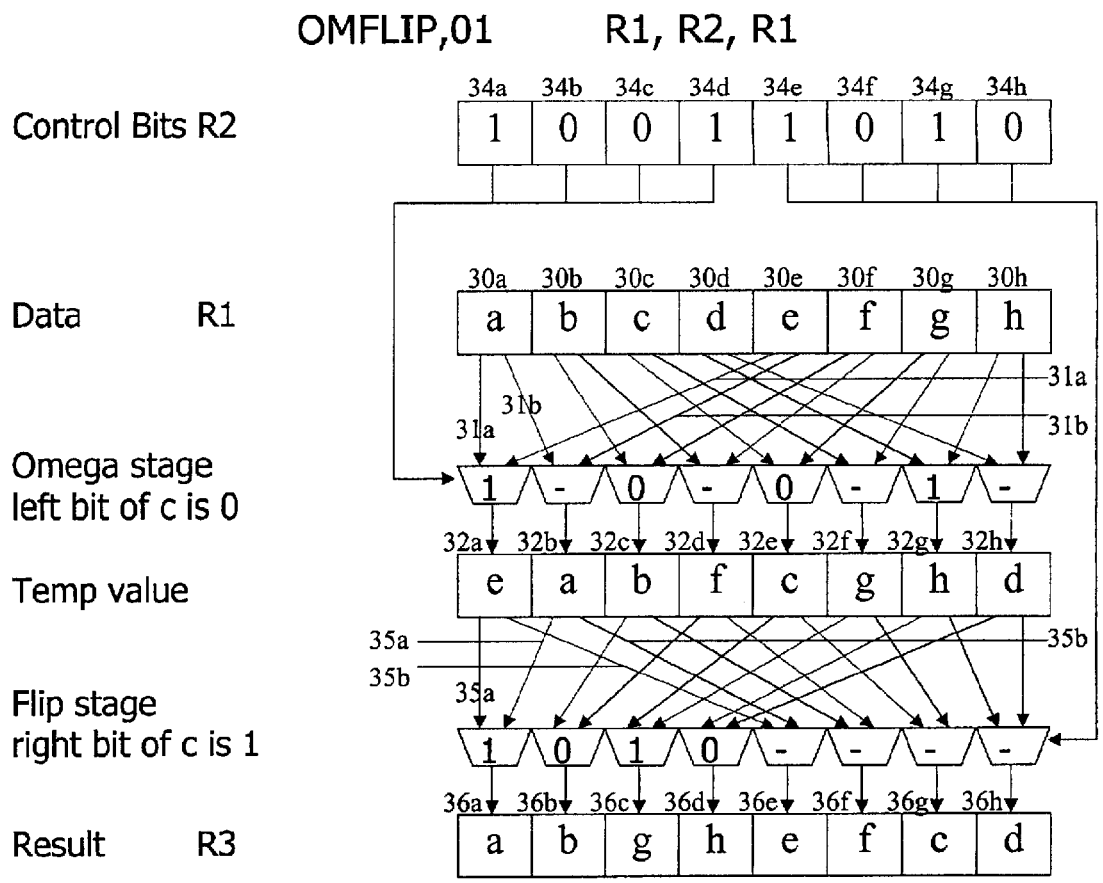
FIG. 3B is a schematic diagram of an implementation of an OMFLIP instruction in accordance with an embodiment of the present invention.

FIG. 3B illustrates an example of operation of an OMFLIP instruction. The source sequence of bits consists of 8 bits: bit a, bit b, bit c, bit d, bit e, bit f, bit g and bit h. The OMFLIP instruction is OMFLIP, 01 R1, R2, R3 wherein the source sequence of bits in register R1 is referred to by abcdefgh, the configuration bits in R2 are 10011010 and the destination sequence of bits received in register R3 is abghefcd. Each of bit positions 30a–30h in source register R1 acts as an input node to this omega-flip network: node 30a receives bit a, node 30b receives bit b, node 30c receives bit c, node 30d receives bit d, node 30e receives bit e, node 30f receives bit f, node 30g receives bit g and node 30h receives bit h.

Each node 30a–30h has two outputs 31a and 31b. Outputs 31a and 31b for each of nodes 30a–30h are configured as an omega stage since the left bit of c is 0. Outputs 31a and 31b for each of nodes 30a–30h are each directed to one node in set of nodes 32a–32h. For example, output 31a of node 30a is directed to node 32a and output 31b of node 30a is directed to node 32b. Output 31a of node 30e is directed to node 32a and output 31b of node 30e is directed to node 32b. Accordingly, node 30a and node 30e are conflict inputs and node 32a and node 32b receive conflict outputs. Similarly, node 30b and node 30f are conflict inputs and nodes 32c and 32d receive conflict outputs. Node 30c and node 30g are conflict inputs and nodes 32e and 32f receive conflict outputs. Node 30d and 30h are conflict inputs and nodes 32g and 32h receive conflict outputs.

Left half of configuration bits in R2 are applied to each pair of conflict outputs and are represented in the first node of each pair of conflict outputs. Accordingly, configuration bit 34a is applied to node 32a, configuration bit 34b is applied to node 32c, configuration bit 34c is applied to node 32e and configuration bit 34d is applied to node 32g.

During operation of the omega operation, node 30a and node 30e have crossing paths to respective nodes 32a and 32b since the configuration bit 34a is 1. Node 30b and node 30f have non-crossing paths to respective nodes 32c and 32d since configuration bit 34b is 0. Node 30c and node 30g have non-crossing paths to respective nodes 32e and 32f since configuration bit 34c is 0. Node 30d and node 30h have crossing paths to respective nodes 32g and 32h since configuration bit 34d is 1. After the omega operation, the intermediate sequence of bits is eabfcghd.

Each of nodes 32a–32h has two outputs 35a and 35b. Outputs 35a and 35b for each of nodes 32a–32h are configured as a flip stage since the right bit of c is 1. Outputs 35a and 35b are each directed to one node in set of nodes 36a–36h. For example, output 35a of node 32a is directed to node 36a and output 35b of node 32a is directed to node 36e. Similarly, output 35a of node 32b is directed to node 36a and output 35b of node 32b is directed to node 36e. Accordingly, node 32a and node 32b receive conflict inputs and node 36a and node 36e receive conflict outputs. Conflict outputs are also received at the respective pairs of nodes 36b and 36f, nodes 36c and 36g, nodes 36d and 36h. Right half of configuration bits in R2 are applied to the first node of each pair of conflict outputs. Accordingly, configuration bit 34e is applied to node 36a, configuration bit 34f is applied to node 36b, configuration bit 34g is applied to node 36c and configuration bit 34h is applied to node 36d.

During operation of the flip operation, node 32a and 32b have crossing paths to nodes 36a and 36e since configuration bit 34e is 1. Node 32c and 32d have non-crossing paths to respective nodes 36b and 36f since configuration bit 34f is 0. Node 32e and node 32f have crossing paths to respective nodes 36c and 36g since configuration bit 34g is 1. Node 32g and node 32h have non-crossing paths to respective nodes 36d and 36h since configuration bit 34h is -0. After the flip operation, the result sequence of bits is abghefcd.

Figure 3C:
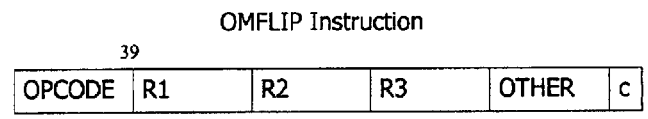
FIG. 3C is a schematic diagram of a layout of an OMFLIP instruction in accordance with an embodiment of the present invention.

FIG. 3C shows one embodiment of the encoding of the OMFLIP instruction 39 for use in a programmable processor. The instruction may also contain other fields. As will be understood by persons of ordinary skill in the art, relative locations of the fields in an instruction are arbitrary and may be varied without violating the spirit of the invention.

Figure 4A:
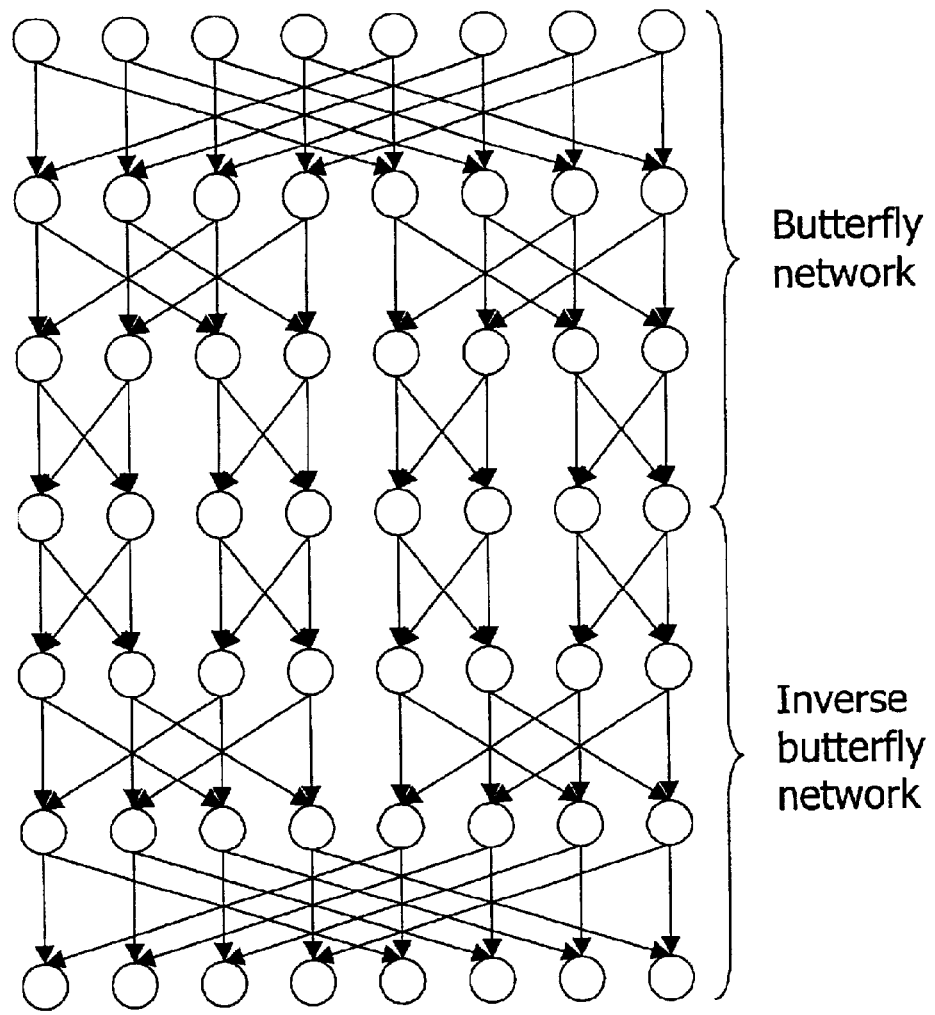
FIG. 4A is a schematic diagram of an 8-input Benes network.
Figure 4B:
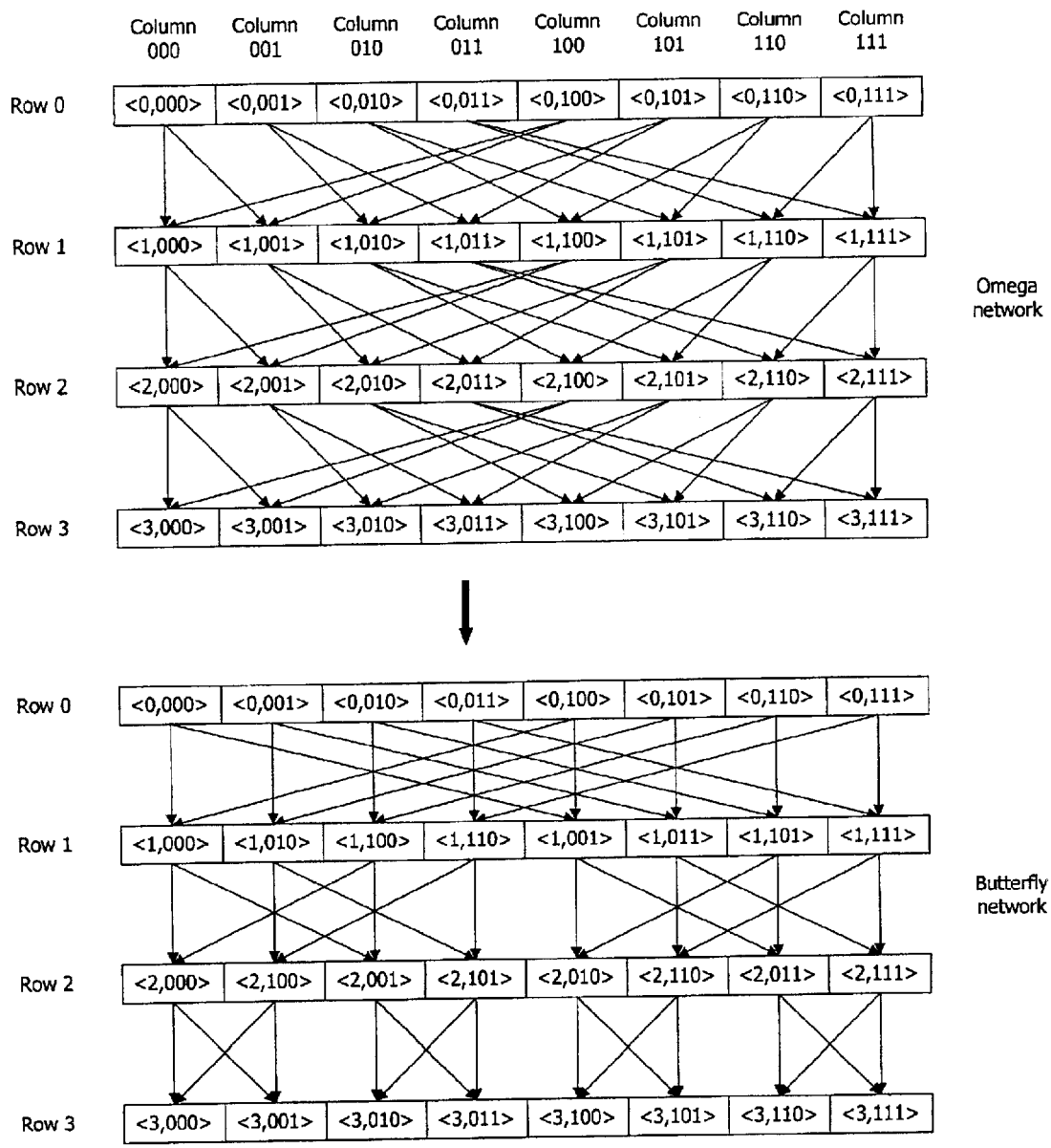
FIG. 4B is a schematic diagram of correspondence between each stage of the omega network and an butterfly network.
Figure 4C:
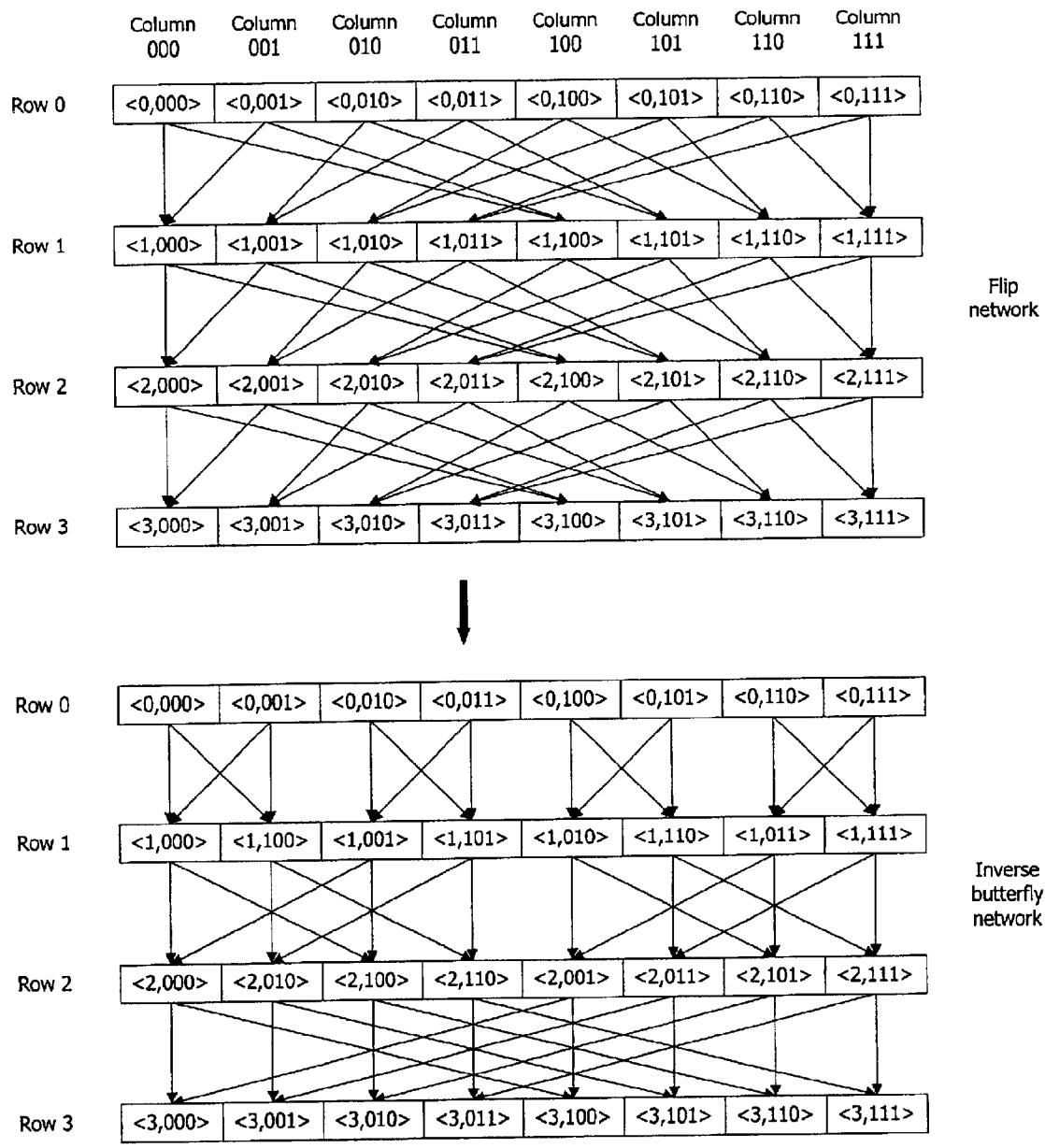
FIG. 4C is a schematic diagram of correspondence between each stage of a flip network and an inverse butterfly network.

It is known that omega networks are isomorphic to butterfly networks and flip networks are isomorphic to inverse butterfly networks. A Benes network is formed by connecting two butterfly networks of the same size back to back. FIG. 4A is a schematic diagram of an 8-input Benes network. FIG. 4B illustrates an 8-input omega network and correspondence between each stage of the omega network and a butterfly network. FIG. 4C illustrates the correspondence between each stage of a flip network and an inverse butterfly network. As a result of the isomorphism, the properties of omega and flip networks are similar to those of butterfly networks. Accordingly, an n-input omega-flip network is functionally equivalent to an n-input Benes network.

Figure 5A:
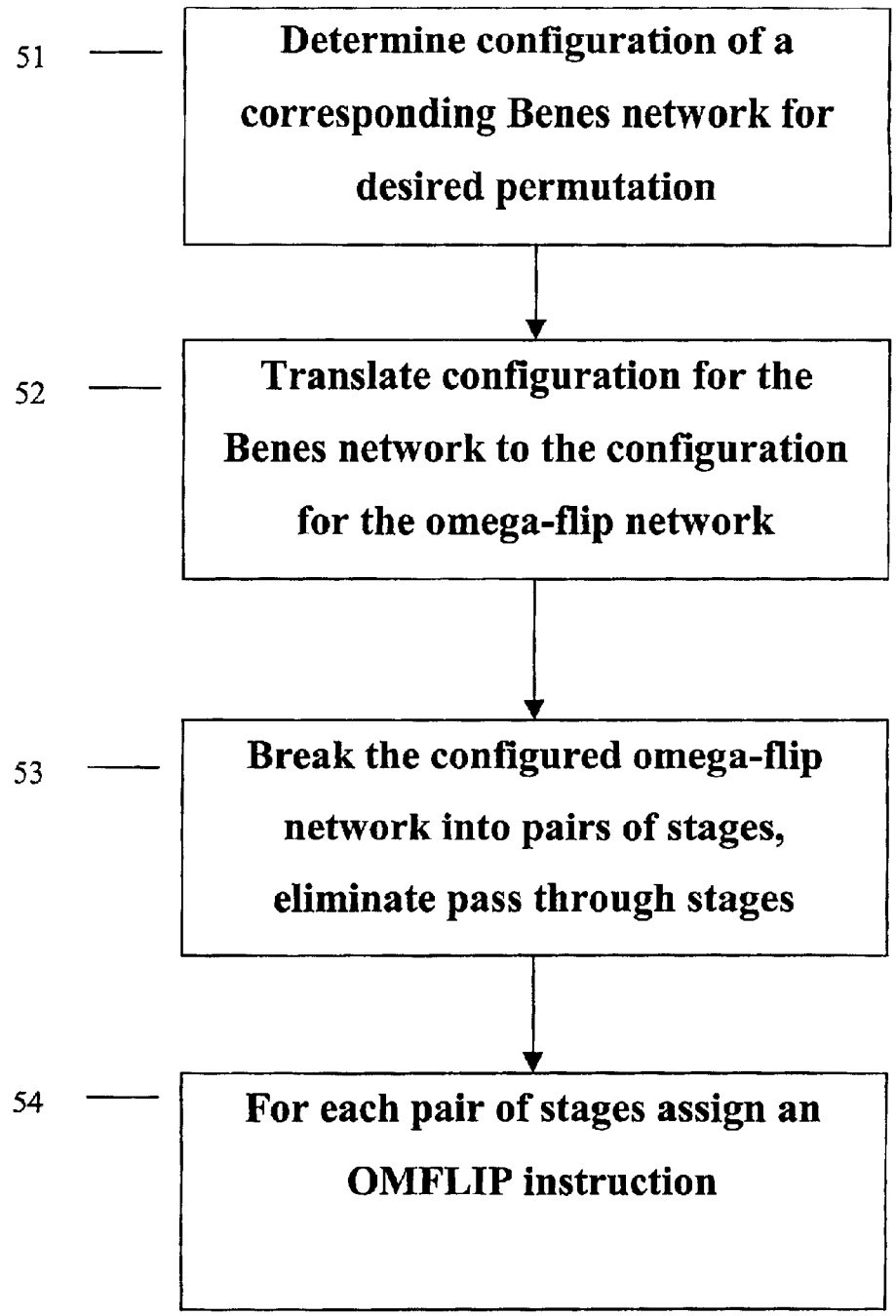
FIG. 5A is a flow diagram of a method for implementing an OMFLIP instruction sequence to do an arbitrary permutation.
Figure 5B:
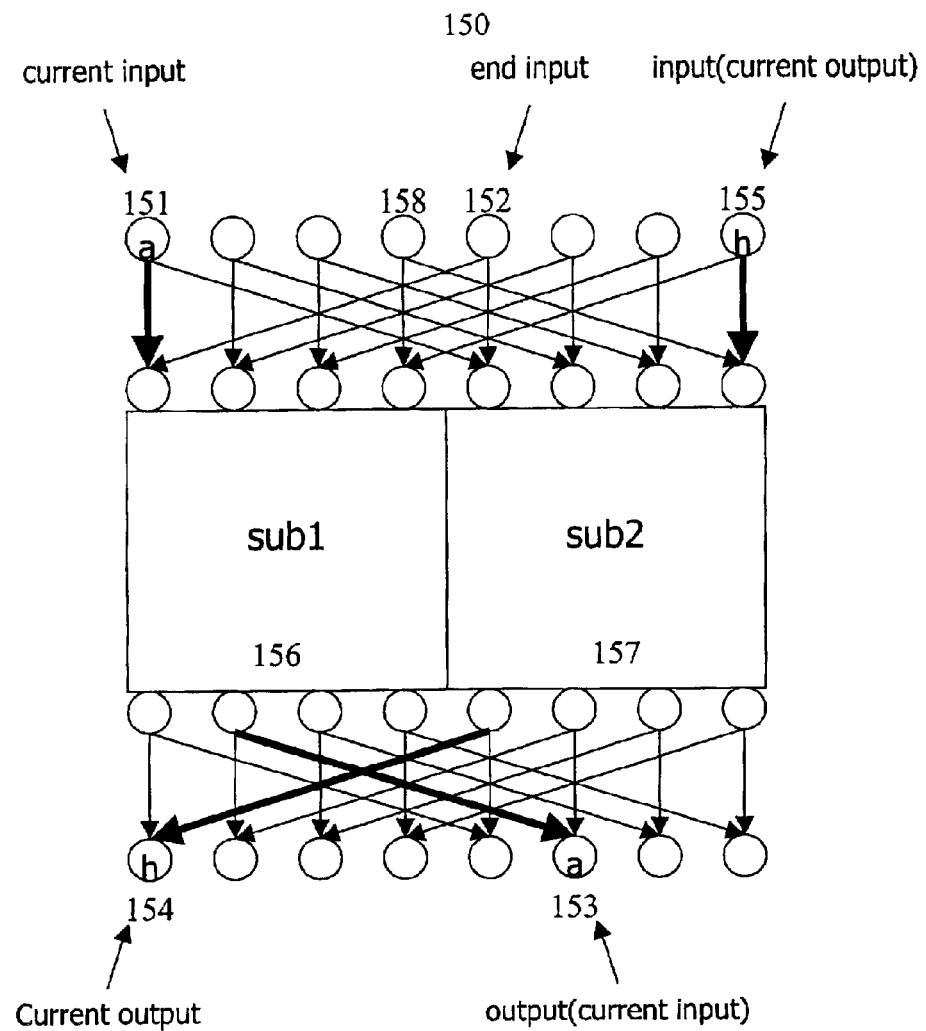
FIG. 5B is a schematic diagram for obtaining configuration bits for an 8-input Benes network based on hierarchical partitioning into subnets.

A method for implementing OMFLIP instructions to do an arbitrary permutation is shown in FIG. 5A. In block 51, a corresponding Benes network is configured for the desired permutation. A Benes network can be configured as described in X. Yang, M. Vachharajani and R. B. Lee, "Fast Subword Permutation Instructions Based on Butterfly Networks", *Proceedings of SPIE, Media Processor* 2000, pp. 80–86, January 2000, herein incorporated by reference. FIG. 5B illustrates the following steps for configuring a Benes network:

1. "Inputs" and "outputs" refer to the inputs and outputs of the current Benes network. Starting from the first input that is not configured, referred to as "current input", set the "end input" to be the conflict input of the "current input". If all "inputs" have already been configured, go to Step 4.

2a. Connect "current input" to the sub-network "sub1" that is on the same side as "current input". Connect the output that has the same value as "current input", to sub1 and call it "output (current input)". Set "current output" to the conflict output of "output (current input)" and go to Step 3.

2b. Connect "current input" to the sub-network "sub1" such that "sub1" is not "sub2". Connect the output that has the same value as "current input", to sub1 and call it "output (current input)". Set "current output" to the conflict output of "output (current input)".

3. Connect "current output" to sub-network "sub2" such that "sub2" is not "sub1". Also connect the input that has the same value as "current output", call it "input (current output)", to "sub2". If "input (current output)" is the same as "end input", go back to Step 1. Otherwise set "current input" to the conflict input of "input (current output)" and go to Step 2b.

4. At this point, all the "inputs" and "outputs" have been connected to the two sub-networks. If the configuration of the two sub-networks is trivial, i.e. n=2, the configuration is done. Otherwise for each sub-network, treat it as a full Benes network and repeat the steps beginning at Step 1.

FIG. 5B illustrates the above steps for permutation (a------h) to (h----a--), where "-" means do-not-care. Starting from an unconfigured Benes network 150, the first input that is not configured is node 151, which contains value a. Node 151 is marked as "current input" and its conflict input, node 152 as "end input". Node 151 is connected to the subnet 156 that is on the same side as node 151. The output that has the value a is node 153. It is marked as "output (current input)". Node 153 is connected to subnet 156, which is the same subnet as node 151 is connected to. The conflict output of node 153 is node 154, which contains value h. Node 154 is referred to as "current output". Node 154 is connected to subnet 157. The input that contains value h is node 155. It is marked as "input (current output)" and is connected to subnet 157. Since node 155 is different from "end input" node 152, "current input" is set to the conflict input of node 155, which is node 158, and the above steps are repeated. This process terminates when all the inputs and outputs of Benes network 150 are configured. Thereafter, each of subnets 156 and 157 is treated as a full Benes network and the whole process is applied to it until the whole Benes network 150 is configured.

In block 52 of FIG. 5A, the configuration of the Benes network is translated into a configuration of an omega-flip network. In block 53, the configured omega-flip network is broken into pairs of stages. Pass-through stages are eliminated. A pass-through stage is one where there is no change going from input to output of the stage. Eliminating pass-through stages can reduce the number of permutation instructions needed to perform the desired permutation. In block 54, an OMFLIP instruction is assigned to each pair of stages. The first OMFLIP instruction takes the original input. Thereafter, each OMFLIP instruction uses the output from the last OMFLIP instruction as input and produces input for the next OMFLIP instruction for implementing intermediate stages. The last OMFLIP instruction generates the final permutation. It has been found that all possible permutations can be performed for subwords in an n-bit register in which each subword can be one or more bits using 1 gr OMFLIP instructions, where r is the number of subwords.

Figure 6A:
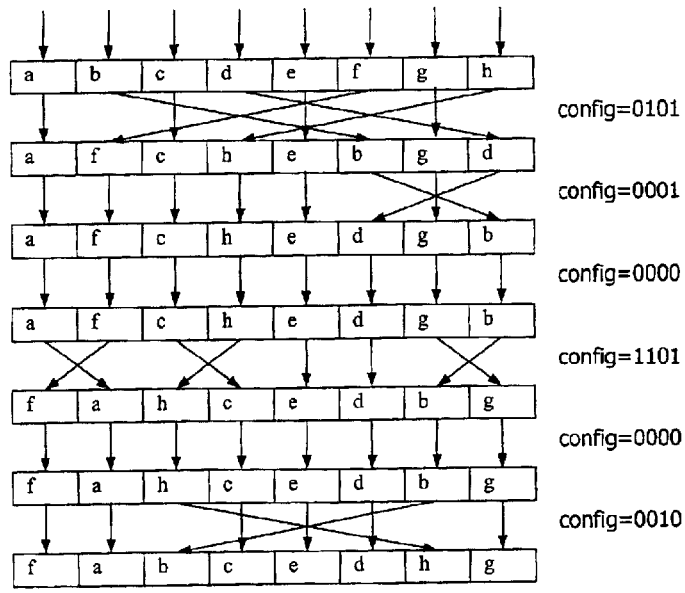
FIG. 6A is a schematic diagram of a Benes network configured for a given permutation.
Figure 6B:
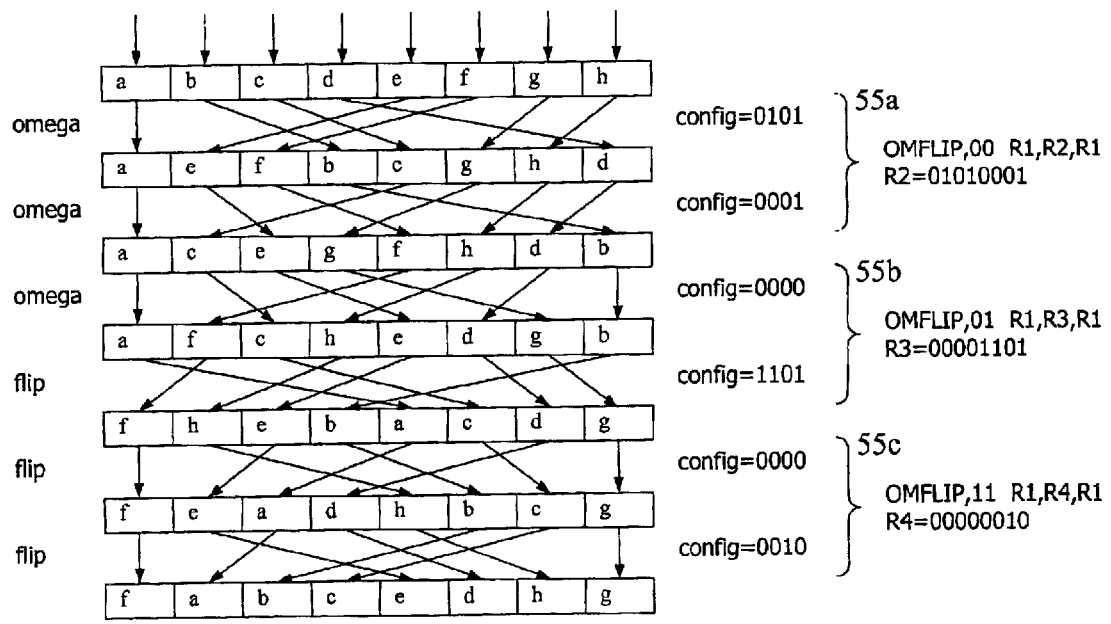
FIG. 6B is a schematic diagram of an omega-flip network configured for the permutation shown in FIG. 6A.

For example, a Benes network for the permutation (abcdefgh) to (fabcedhg) after implementation of block 51 is shown in FIG. 6A. Configuration bits are determined for each node. The configuration bits are read from left to right through nodes from left to right. FIG. 6B illustrates a translation of the configured Benes network to an omega-flip network after implementation of block 52 for the same permutation (abcdefgh) to (fabcedhg). The omega-flip network is broken into stage pairs 55a–55c, by performing block 53. Performing block 54, the OMFLIP instruction OMFLIP 00 R1, R2, R1 is assigned to stage pair 55a with the configuration bits of R2=01010001. OMFLIP instruction OMFLIP 01 R1, R3, R1 is assigned to stage pair 55b with the configuration bits of R3=00001101. OMFLIP instruction OMFLIP 11, R1, R4, R1 is assigned to stage pair 55c with the configuration bits of R4=00000010. For example, the fifth and seventh nodes (labeled with bits 'e' and 'g') in the second stage of the Benes network are configured using one bit as shown in FIG. 6A. This bit is the second bit from the left in the configuration bits for this stage, which is 0. This bit is also used to configure the second and sixth nodes in the second stage of the omega-flip network as shown in FIG. 6B, which correspond to the fifth and seventh nodes in the Benes network. This bit is the third bit from the right in R2 of the first OMFLIP instruction. The permutation produced by a sequence of OMFLIP instructions can be reversed by reversing the order of the instructions, reversing the order of the stages in each instruction, changing an omega stage into a flip stage and changing a flip stage into an omega stage, and keeping the configuration bits the same for each stage.

Figure 7:
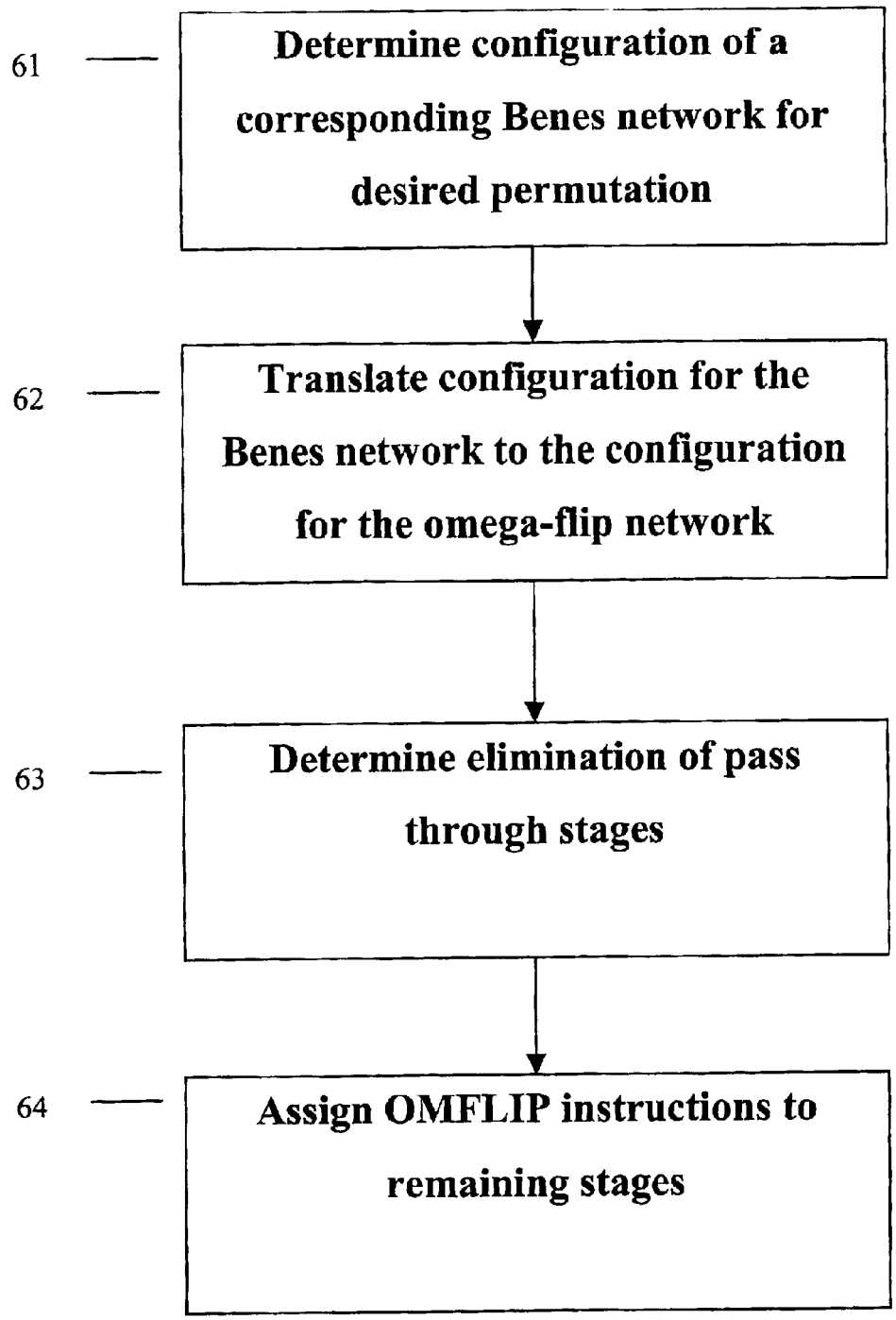
FIG. 7 is a flow diagram of a method for reducing the number of permutation instructions needed for multi-bit subwords in accordance with an embodiment of the present invention.
Figure 8A:
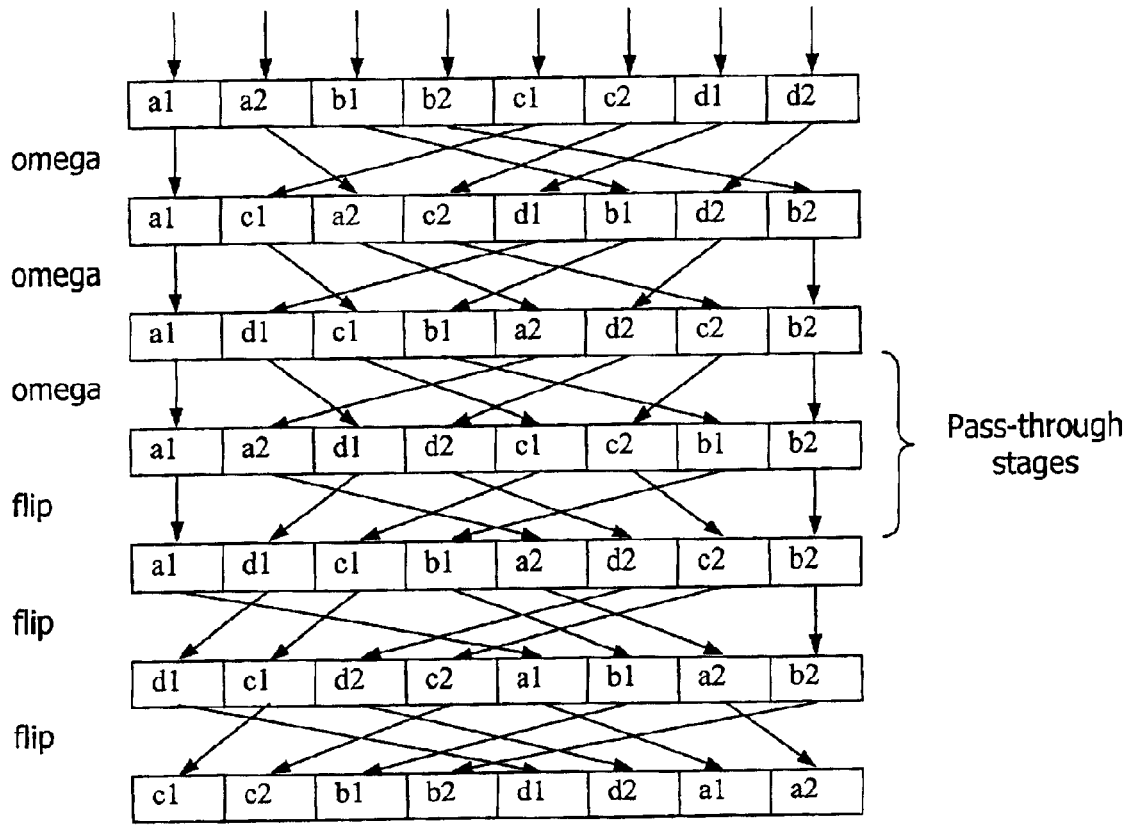
FIG. 8A is a schematic diagram of an omega-flip network configured for a multi-bit permutation including pass through stages.
Figure 8B:
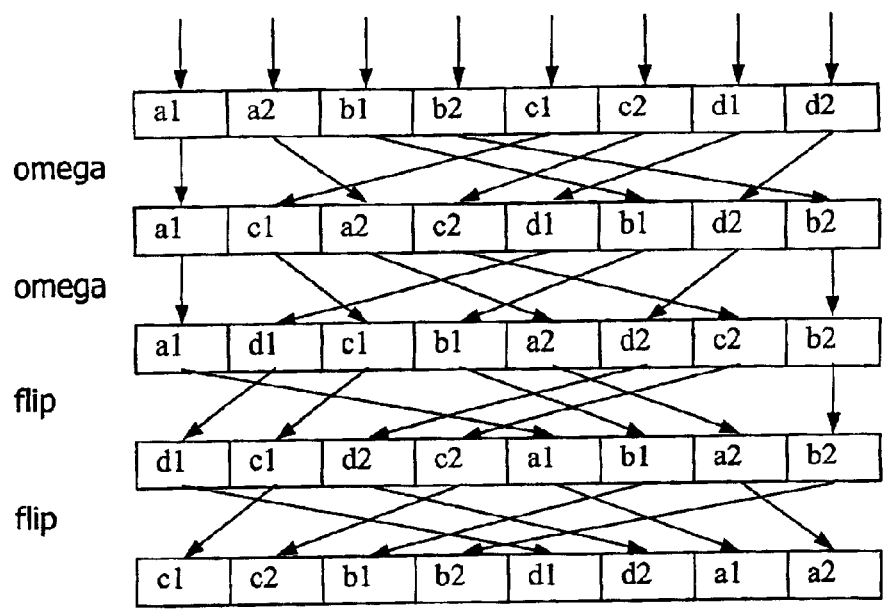
FIG. 8B is a schematic diagram of the omega-flip network of FIG. 8A after elimination of pass through stages.

A schematic diagram of a method for permutation of multi-bit subwords 60 is shown in FIG. 7. Each subword contains more than one bit. Multi-bit subwords can be represented as a k-bit subword permutation. Blocks 61 and 62 are identical to blocks 51 and 52 in FIG. 5A. In block 63, a determination is made for eliminating pass through stages. For subword permutations, some stages of the omega-flip network can be configured as pass-throughs. Because the bypassing connections only serve to copy the inputs to the outputs, these stages can be removed before the assignment of the OMFLIP instructions. For example if 2k stages are removed, there will be k fewer instructions. An example of an implementation of method 60 is shown in FIGS. 8A and 8B. FIG. 8A illustrates the configuration of an 8 input omega-flip network for a 2-bit permutation of $(a_1a_2b_1b_2c_1c_2d_1d_2) \rightarrow (c_1c_2b_1b_2d_1d_2a_1a_2)$ in which the middle 2 stages of the omega-flip network copy the input bits to their output without any change of order as determined from block 63. The middle stages are eliminated from the configured omega-flip network as shown in FIG. 8B. In block 64, the instructions are assigned to the remaining stages without affecting the result. In general, when permuting k-bit subword in an n-bit word, the middle 21 gk stages of the omega-flip network are configured as pass-throughs. Accordingly, when permuting k-bit subwords in an n-bit word, the maximum number of instructions needed becomes 1 gn−1 gk=1 g(n/k)=1 gr, where r is the number of subwords in a word.

Pass-through stages can be in other stages than the middle stages in an omega-flip network, caused by configuring permutations on multi-bit subwords. Pass-through stages can also occur in other stages in the network, and in the bit-level permutations, i.e., permutations of 1-bit subwords. Pass-through stages can be eliminated in forming OMFLIP permutation instructions, to reduce the number of permutation instructions needed to perform the desired permutation in block 53 in FIG. 5A and block 63 in FIG. 7.

Figure 9A:
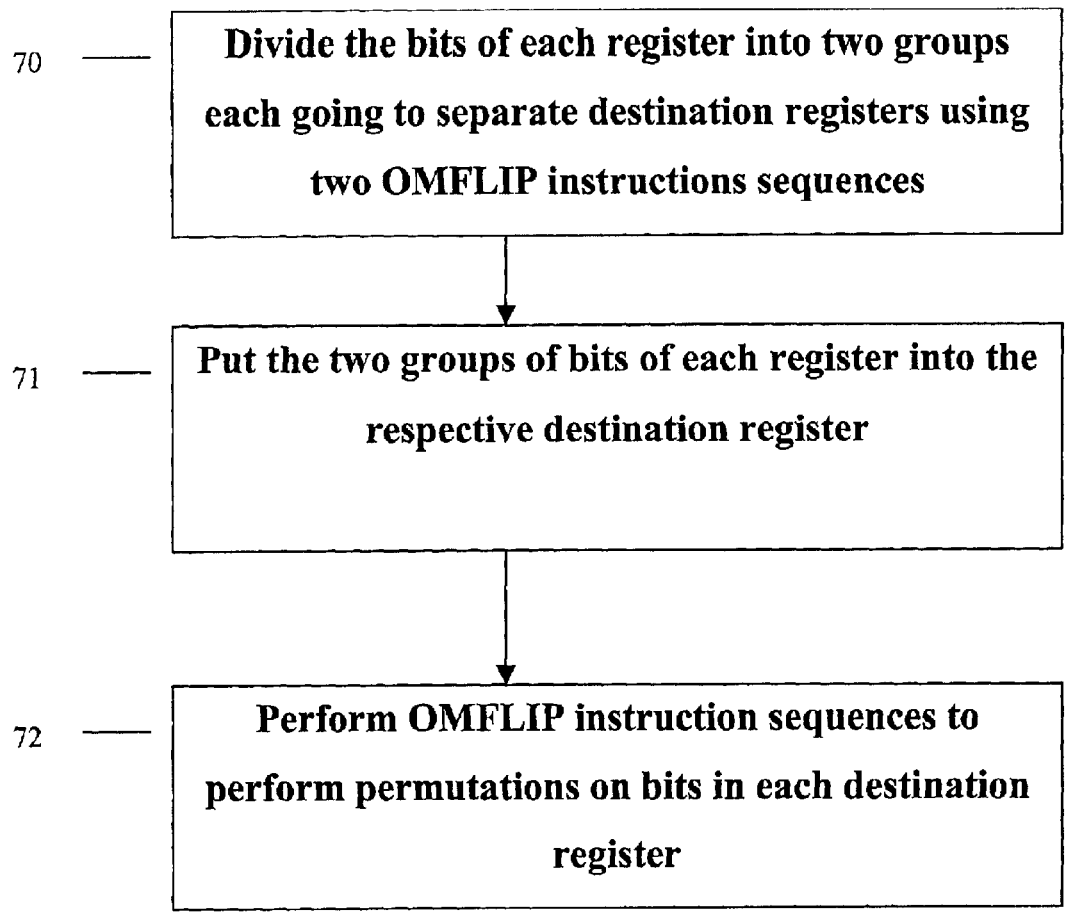
FIG. 9A is a flow diagram of a method for 2n-bit permutations in accordance with an embodiment of the present invention.
Figure 9B:
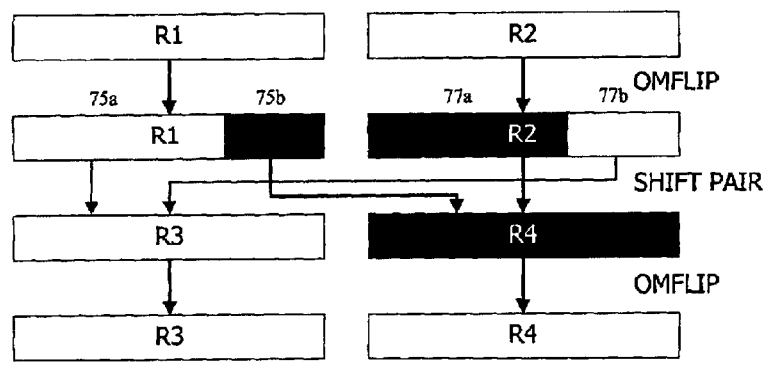
FIG. 9B is a schematic diagram of an implementation of the method shown in FIG. 9A.

The OMFLIP instruction can be used to permute subwords packed into more than one register. If a register is n bits, two registers are 2n bits. The OMFLIP instructions can be used for 2n-bit permutations by using an instruction such as the SHIFT PAIR instruction in PA-RISC, as described in Ruby Lee, "Precision Architecture", *IEEE Computer*, Vol. 22, No. 1, pp. 78–91, January 1989, and Ruby Lee, Michael Mahon, Dale Morris, "Pathlength Reduction Features in the PA-RISC Architecture", *Proceedings of IEEE Compcon*, pp. 129–135, Feb. 24–28, 1992, San Francisco, Calif., hereby incorporated by reference into this application. The SHIFT PAIR instruction can process operands that cross word boundaries. This instruction concatenates two source registers to form a double-word value, then extracts any contiguous single-word value. FIGS. 9A and 9B illustrate an example of performing 2n-bit permutations using SHIFT PAIR and OMFLIP instructions. In this example, source registers R1 and R2 store the bits to be permuted and the results are put in destination register referred to by R3 or R4.

In block 70, the bits of the source registers R1 and R2 are divided into two groups using two OMFLIP instruction sequences. Each OMFLIP instruction sequence contains at most 1 gn OMFLIP instructions. One OMFLIP instruction sequence is for R1 and one OMFLIP instruction sequence is for R2. For example, for R1, the bits going to register R3 are put into a left group and the bits going to R4 into the right group. In R2 the bits going to register R4 are put into a left group, and the bits going to register R3 are put into a right group. After performing block 70, register R1 is divided into left group 75a and right group 75b as shown in FIG. 9B. Register R2 is divided into left group 77a and right group 77b.

In block 71, using two SHIFT PAIR instructions, all bits going to register R3 are put into R3 and all bits going to register R4 are put into R4. After the implementation of block 71, register R3 includes the bits of left group 75a and right group 77b and register R4 includes the bits of right group 75b and left group 77a. In block72, considering R3 and R4 as separate n-bit words, n-bit permutations are performed on register R3 and register R4. Each of R3 and R4 can use up to 1 gn instructions. In total, excluding the instructions needed for loading control bits, 41 g(n)+2 instructions are needed to do a 2 n-bit permutation. Accordingly, with 64-bit registers, a 128-bit permutation can be performed with 26 instructions.

Figure 10A:
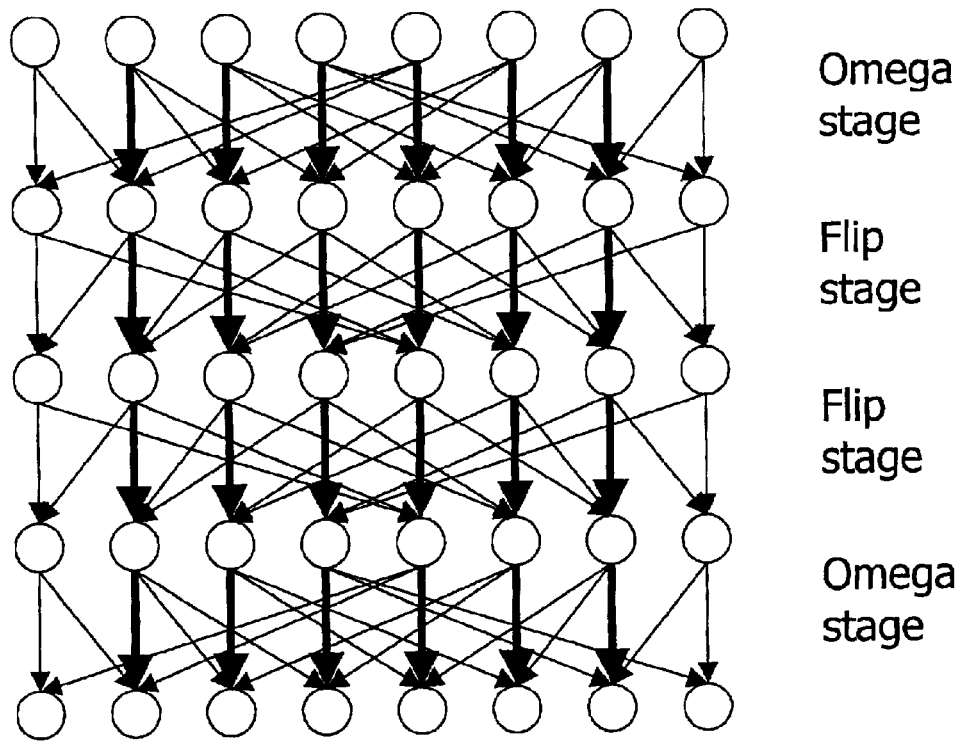
FIG. 10A is a high-level schematic diagram of a circuit implementation for OMFLIP instructions in accordance with an embodiment of the present invention.

FIG. 10A illustrates one embodiment of a high-level schematic diagram of a circuit implementation 80 for OMFLIP instructions. The circuit implementation implements four stages: a modified omega stage, followed by a modified flip stage, followed by a modified flip stage, followed by a modified omega stage. In this embodiment, a modified omega stage is an omega stage with pass throughs. A pass through is a path from an input node to the corresponding output node. Such pass-through paths are not available in a conventional omega stage or flip stage of conventional omega-flip networks, except for the first and last nodes. This circuit can be used to implement four variants of two stages of an omega-flip network which are omega-omega, omega-flip, flip-omega, or flip-flip. When executing an OMFLIP instruction, the control logic selects the proper two stages for the two basic operations based on the sub-opcode c. Thereafter, the OMFLIP instruction configures the two selected stages according to the left half and right half of the configuration register R2. The stages that are not used are configured as pass-throughs in 80. Bypassing connections in the two omega stages and the two flip stages are shown using thicker lines in FIG. 10A. This implementation can also achieve the flip-omega combination, which is a flip stage followed by an omega stage. This combination of stages is not achieved in a conventional omega-flip network, where lgn omega stages are followed by 1 gn flip stages, as shown in FIG. 3A for n=8. Accordingly, the embodiment in FIG. 10A can be more powerful in function with four modified omega or modified flip stages than a full implementation of a conventional omega-flip network with 21 gn stages. For example, for n=64 bits, 12 stages are needed for the full omega-flip network, but the number of stages are reduced to 4 modified stages using circuit 80. The functionality of a full "virtual" omega-flip network is achieved by executing a sequence of OMFLIP permutation instructions, each using the reduced circuit 80 in this embodiment.

Figure 10B:
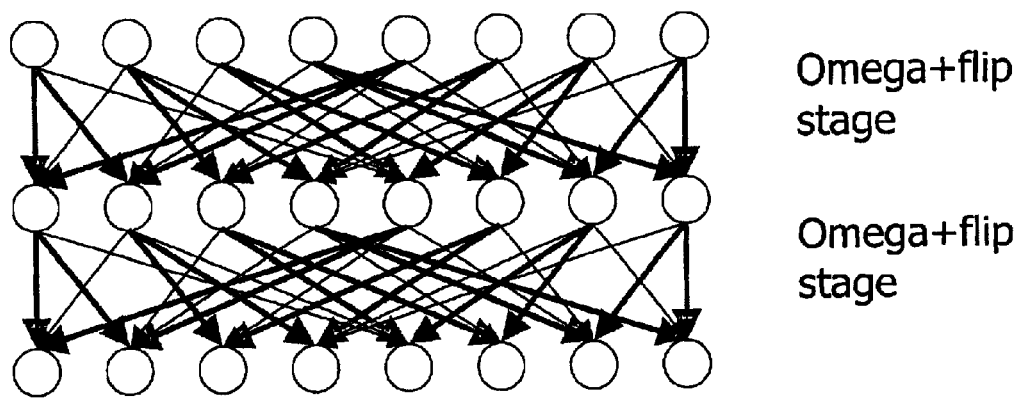
FIG. 10B is a high-level schematic diagram of a circuit implementation for OMFLIP instructions in accordance with an alternate embodiment of the present invention.

FIG. 10B illustrates a second embodiment of a high level schematic diagram of a circuit implementation 82 for OMFLIP instructions. Circuit 82 has two identical stages. Each stage can be either an omega stage or a flip stage. This is compared with FIG. 10A, where circuit 80 has four stages, each stage being either an omega stage or a flip stage (but not both) with pass-through paths. This embodiment is used to achieve the functionality of a full "virtual" omega-flip interconnection network since not all stages of the omega-flip interconnection network are implemented. For example, for n=64 bits, 12 stages are needed for the full omega-flip network, but the stages are reduced to 2 stages using circuit 82. The functionality of a full "virtual" omega-flip network is achieved by executing a sequence of OMFLIP permutation instructions, each using the reduced circuit 82 in this embodiment.

Figure 11A:
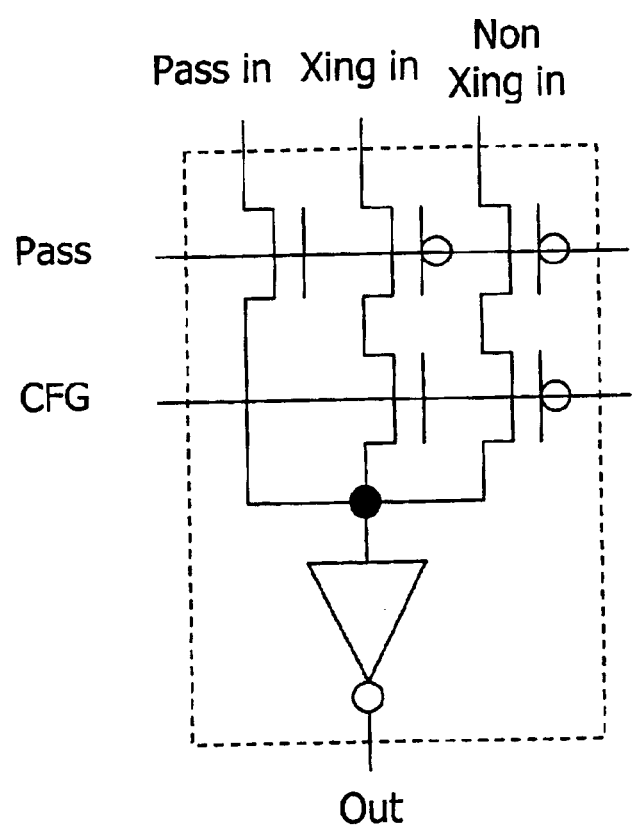
FIG. 11A is a schematic diagram of a circuit implementation of OMFLIP instructions for an individual node.
Figure 11B:
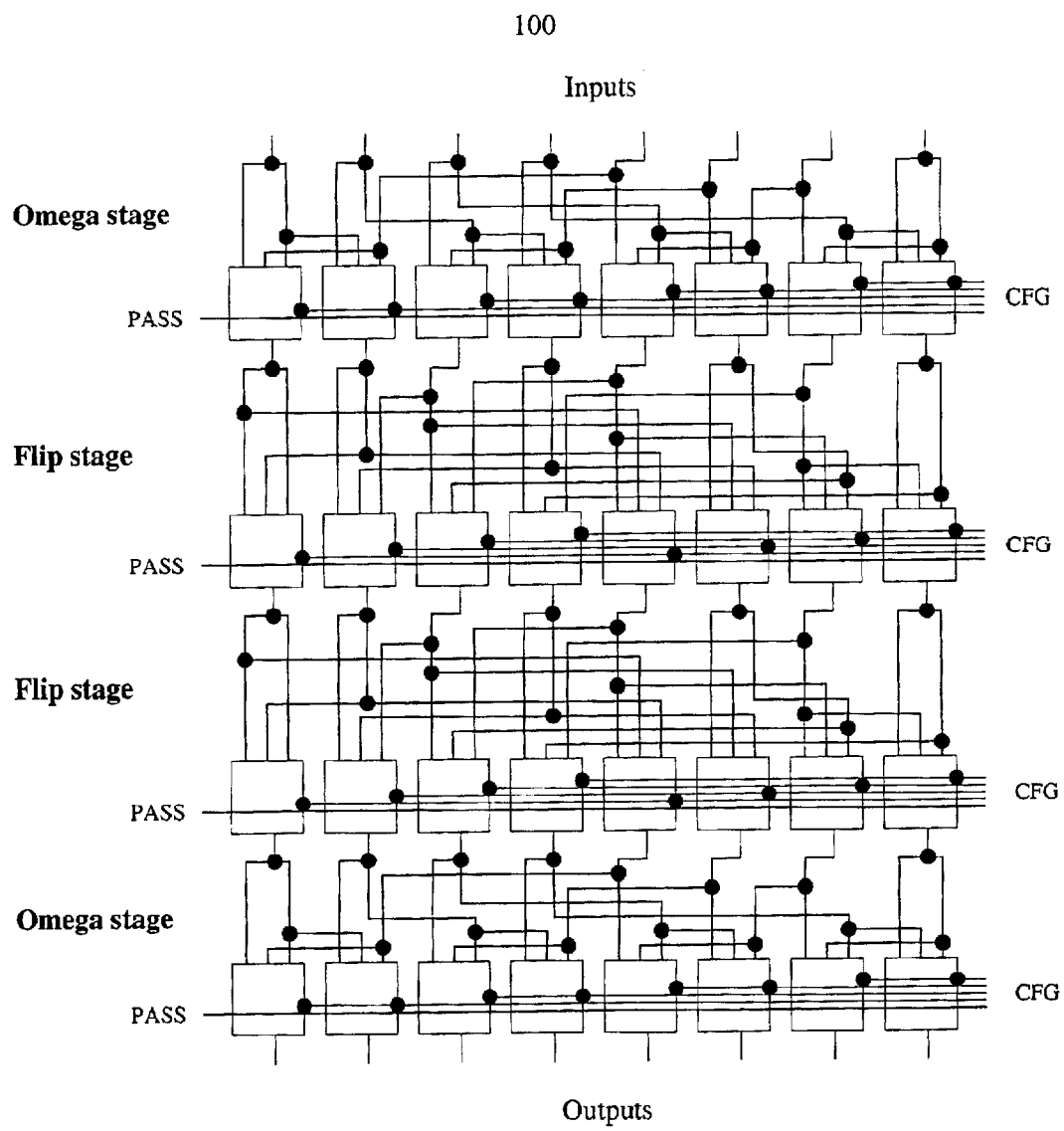
FIG. 11B is a schematic diagram of a circuit implementation of OMFLIP instructions for an 8-bit implementation.
Figure 11C:
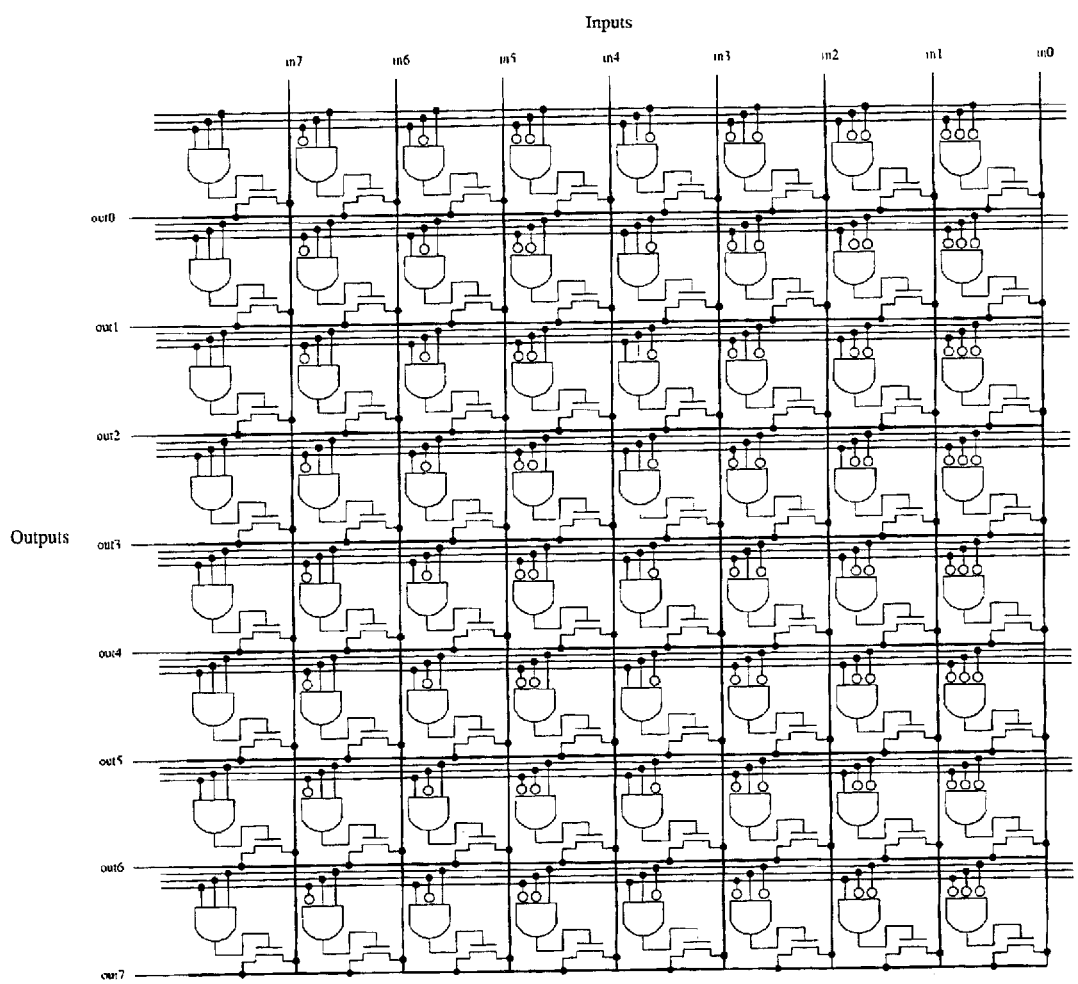
FIG. 11C is a schematic diagram of a circuit implementation of an 8×8 crossbar for comparison with the circuit implementation of OMFLIP instructions.

A circuit diagram for the OMFLIP instructions of an individual node 90 is shown in FIG. 11A. An 8-bit implementation for the OMFLIP instructions 100 is shown in FIG. 11B. FIG. 11B is a more detailed diagram illustrating the embodiment 80 in FIG. 10A. FIG. 11A shows the circuit implementation of one node of FIG. 11B. FIG. 11C is a circuit diagram for an 8-bit crossbar, which can be used by one skilled in the art to achieve any permutation of n=8 bits. FIG. 11C is used to compare the efficiency of the circuit implementation of the embodiment of the OMFLIP permutation instruction shown in FIG. 11B.

Horizontal and vertical track counts and transistor counts have been calculated for a circuit implementation of OMFLIP instruction based on the omega-flip network of the present invention and are compared to a circuit implementation of a crossbar network for 8-bit and 64-bit permutations in Table 2. The numbers in Table 2 are computed as follows:

For the OMFLIP instruction implementation, the following relationships are used, $$\text{Vertical Tracks} = 3n$$

$$\text{Horizontal Tracks} = 4 \times \left(1 + \frac{n}{2}\right) + O(n)$$

$$= 4 + 2n + O(n) \approx 4 + 6n$$

$$\text{Transistors} = 4n \times 7 = 28n$$

The 3n vertical tracks come from the 3 input lines in each node. The number of horizontal tracks is composed of three parts: 4 pass signals for the 4 stages, n/2 configuration lines per stage for the 4 stages, and the number of data tracks needed between adjacent stages, which is O(n) (about 4 n).

For implementation of an 8-input crossbar network, $$\text{Vertical Tracks} = n$$

$$\text{Horizontal Tracks} = n \times (1 + \lg n) = n + n \lg n$$

$$\text{Transistors} = n \times \left(n + \sum_{i=0}^{\lg n} \binom{\lg n}{i}(2 \lg n + 2i)\right)$$

$$= O(n^2 \lg n) > 3n^2 \lg n$$

The vertical tracks consist of the n input data lines. The horizontal tracks consist of the n output data lines and the 1 gn configuration lines for each output data line. The number of transistors are for the AND gate and pass transistor at each cross point. An alternative implementation of crossbar is to provide a negated signal for each control signal so that no inverters before AND gates are needed. Then the horizontal track count becomes n+2 n1 gn and the transistor count becomes $n^2(1+21$ gn). This implementation may yield a larger size due to more horizontal tracks used.

From these equations, it is shown that when n is large, the OMFLIP instructions yield the smaller size. As shown in table 2, the OMFLIP circuit implementation yields much smaller transistor count and reasonable track counts for permutations of 64 bits. Accordingly, it yields more area-efficient implementation. Control logic circuits for generating the configuration signals, which are more complex for the crossbar than for OMFLIP, were not counted.

TABLE 2

|  | Vertical tracks | Horizontal tracks | Transistors |
| --- | --- | --- | --- |
| 8-bit permutations |  |  |  |
| Omega-flip (omflip) | 24 24(data) | 50 30(data) 20(control) | 224 |
| Crossbar | 8 8(data) | 32 8(data) 24(control) | 640 |
| 64-bit permutations |  |  |  |
| Omega-flip (omflip) | 192 192(data) | ≈400 ≈250(data) 132(control) | 1792 |
| Crossbar | 64 64(data) | 448 64(data) 384(control) | >73728 |

Table 3 shows a comparison of the number of instructions needed for permutations of a 64-bit word with different subword sizes for method 10 using OMFLIP instructions and the best method available using a combination of conventional instruction set architectures (ISAs) as described in Ruby Lee, "Precision Architecture", *IEEE Computer*, Vol. 22, No. 1, pp. 78–91, January 1989, and Ruby Lee, "Subword Parallelism in MAX-2", *IEEE Micro*, Vol. 16, No. 4, pp. 51–59, August 1996, and Motorola Corporation, "'AltiVec Extensions to PowerPC' Instruction Set Architecture Specification", Motorola Corporation, May 1998, as described above.

TABLE 3

| Subword size in bits | Num of subwords in register | Max[a] num of OMFLIP | existing ISAs |
| --- | --- | --- | --- |
| 1 | 64 | 6 | 30[b] |
| 2 | 32 | 5 | 30[b] |
| 4 | 16 | 4 | 30[b] |
| 8 | 8 | 3 | 1[c,d] |
| 16 | 4 | 2 | 1[c] |
| 32 | 2 | 1 | 1[c] |

[a]The maximum number here is lgn.
[b]Instruction counts using table lookup methods, actual cycle counts will be larger due to cache misses.
[c]Using subword permutation instructions.
[d]Only VPERM in AltiVec is able to do this in one instruction.

The performance gain of the use of OMFLIP instructions for a permutation in a cryptography program, as described in the Data Encryption Standard, (DES) by B. Schneier, "Applied Cryptography: Protocols, Algorithms, and Source Code", C. John Wiley & Sons, Inc., New York, N.Y. second edition, 1996, were determined. The initial permutation in DES is a fixed 64-bit permutation done for each 64-bit data block at the beginning of encryption or decryption. The permutation was performed in three different ways: table lookup, logical operations and OMFLIP instructions. When using the table lookup method, the permutation can be achieved by referencing the following eight 256-entry tables:

$$res = \text{IP\_tbl1}[(src\ \&0 \times 00000000000000ff)]$$

$$\text{IP\_tbl2}[(src\ \&0 \times 000000000000ff00) >> 8]$$

$$\text{IP\_tbl3}[(src\ \&0 \times 0000000000ff0000) >> 16]$$

$$\text{IP\_tbl4}[(src\ \&0 \times 00000000ff000000) >> 24]$$

$$\text{IP\_tbl5}[(src\ \&0 \times 000000ff00000000) >> 32]$$

$$\text{IP\_tbl6}[(src\ \&0 \times 0000ff0000000000) >> 40]$$

$$\text{IP\_tbl7}[(src\ \&0 \times 00ff000000000000) >> 48]$$

$$\text{IP\_tbl8}[(src\ \&0 \times ff00000000000000) >> 56]$$

which is mapped to 30 instructions on a 64-bit machine. Using logical operations, the permutation can be done using 15 XOR's, 10 SHIFT's and 5 AND's on a 32-bit architecture, as in the libdes implementation as described in E. Young, "libdes DES implementation, " January 1997. ftp://ftp.psy.uq.oz.au/pub/Crypto/DES/. This implementation can be mapped to 34 instructions on a 64-bit machine. With the OMFLIP instructions, at most 6 omflip instructions are needed to do each of the DES fixed 64-bit permutations resulting in a five fold speedup over the conventional table lookup or logical operations approaches.

The DES comprises two parts, encryption or decryption, and key scheduling. The performance of the implementation using the OMFLIP instruction of the present invention is compared with that using the conventional table lookup method by simulation in Table 4.

TABLE 4

|  | Encryption/decryption | Key scheduling |
|---|---|---|
| Table lookup | 1 | 1 |
| Omflip | 1.33 | 16.55 |

Table 4 shows the speedup of OMFLIP over table lookup for DES. The speed up is achieved using OMFLIP instructions for a 2-way superscalar architecture with 1 load-store unit and a cache system similar to conventional Pentium III™ processors. The improved speedup for the key scheduling in the present invention is due to the many different permutations performed, and the cache misses generated by the conventional table lookup method.

Figure 12A:
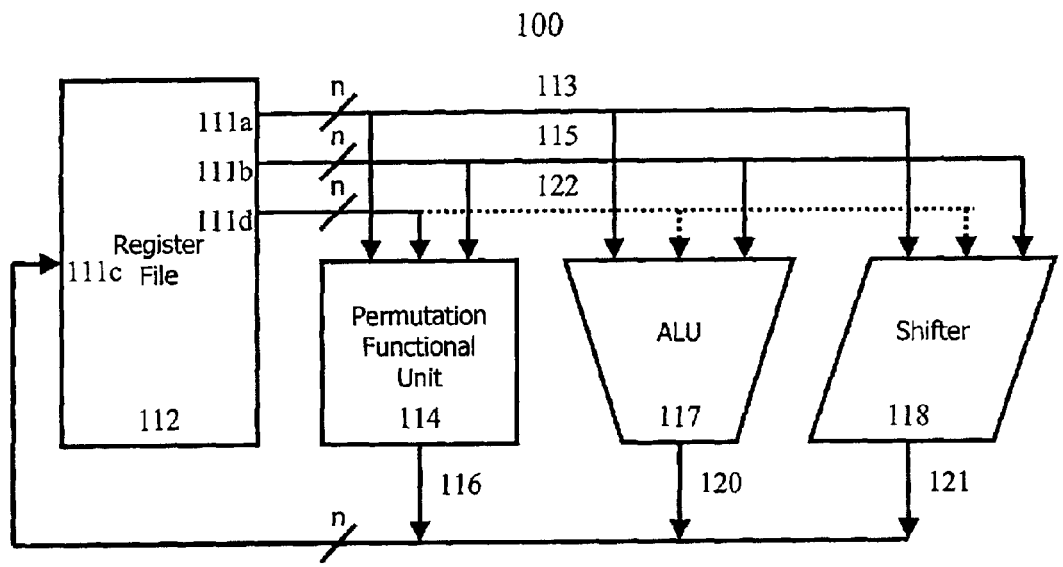
FIG. 12A is a schematic diagram of a system for implementing permutation instructions in accordance with an alternate embodiment of the present invention.

FIG. 12A illustrates an alternate embodiment of the invention, in which a single permutation instruction can perform more than two omega-flip stages. In system 100 register file 112 includes three read ports, 111a, 111b, 111d. Two registers 111b and 111d can be used to send configuration bits 115 and 122 to permutation unit 114. Accordingly, system 100 allows four omega or flip stages to be performed in one permutation instruction. This allows any arbitrary permutation of n bits to be performed in an instruction sequence of (2l gn)/4, or 1 gn/2 instructions. As is understood by one of ordinary skill in the art, this can be extended to sending more configuration bits with each permute instruction, thus performing more omega-flip stages per instruction, and reducing the number of instructions in the instruction sequence needed for any arbitrary permutation of n bits. The minimum number of instructions needed is one instruction achieved by sending 1 gn registers with configuration bits with the one register of n bits to be permuted in the permutation instruction. Accordingly, this allows any arbitrary permutation of n bits to be performed in an instruction sequence of 2l gn/m instructions where m is the number of network stages performed by one permutation instruction.

Figure 12B:
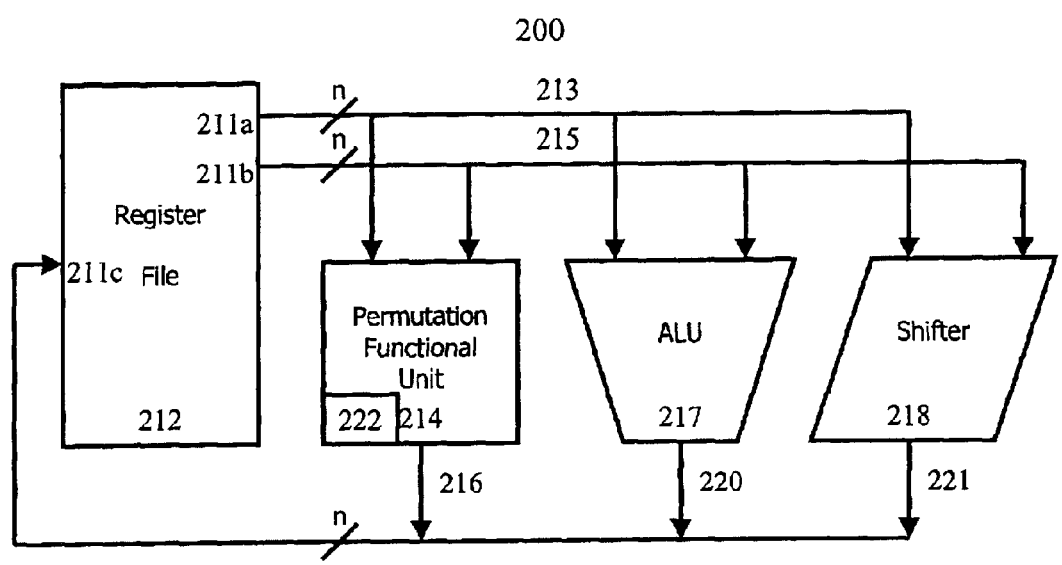
FIG. 12B is a schematic diagram of a system for implementing permutation instructions in accordance with another alternate embodiment of the present invention.

FIG. 12B represents an alternate embodiment of the invention, where all of the nl gn configuration bits are stored in the memory 222, rather than read from the register 211b (or from the registers 111b and 111d in FIG. 12A). The n-bit value 213 to be permuted is read from register 211a and sent to the permutation functional unit 214. This embodiment is useful if the same n-bit permutation is repeated many times for different n-bit values. The sequence of permutation instructions needed to perform this n-bit permutation is reduced to one instruction.

In an alternate embodiment using system 200 of FIG. 12B, only (n−1)1 gn configuration bits are stored in memory 222. This allows a small subset of n-bit permutations to be performed in one instruction, by reading n configuration bits 215 from register 211b and sending this with the n-bit value 213 from register 211a to permutation unit 214.

In another embodiment using system 200 of FIG. 12B, the permutation result can be temporarily stored in permutation functional unit 214. In system 200, the bits of an intermediate permutation result 216 are stored in memory 222 of permutation functional unit 214 after the generation of intermediate permutation result 216. In a subsequent execution of a permutation instruction, the source bits can be used from memory location 222 instead of being fetched from register file 212. During the subsequent execution, both of the source registers 211a and 211b are used for configuration bits in a permutation instruction. Accordingly, the desired permutation can be performed in fewer instructions.

The OMFLIP instruction, in any of the above described embodiments, can be used by itself, rather than in a sequence of instructions. The OMFLIP instruction generates a subset of all possible permutations. A permutation performed by a single OMFLIP instruction can be reversed by reversing the order of the stages used in the OMFLIP instruction, changing an omega stage into a flip stage and vice-versa, with the configuration bits for each stage being the same as for the original permutation. For example as shown in the two diagrams on the left half of FIG. 13, the permutation achieved by OMFLIP, 01 R1, R2, R11, where R2=10000101 can be reversed by doing OMFLIP, 01 R11, R3, R21, where R3=01011000, and R21 will have the same n-bit value as R1 before performing the first OMFLIP, 01R1, R2, R11 instruction. To reverse and OMFLIP instruction, we must first reverse the order of the stages and then change omega to flip and flip to omega stages. For example, the permutation achieved by

OMFLIP, 01 R1, R2, R11; R2=10000101 can be decomposed into 2 stages:

Omega R1, 1000, TEMP1

Flip TEMP1, 0101, R11

To reverse this OMFLIP instruction, the result in register R11 is permuted back into the original value in register R1. To do this, the order of the stages are first reversed (starting with the contents of register R11 as the source bits):

Flip R11, 0101, TEMP2

Omega TEMP2, 1000, R21

Then, an omega stage is changed to a flip stage and a flip stage to an omega stage:

Omega R11, 0101, TEMP2

Flip TEMP2, 1000, R21

This is encoded into one OMFLIP instruction as follows:

OMFLIP, 01 R11, R3, R21; R3=01011000

Figure 13:
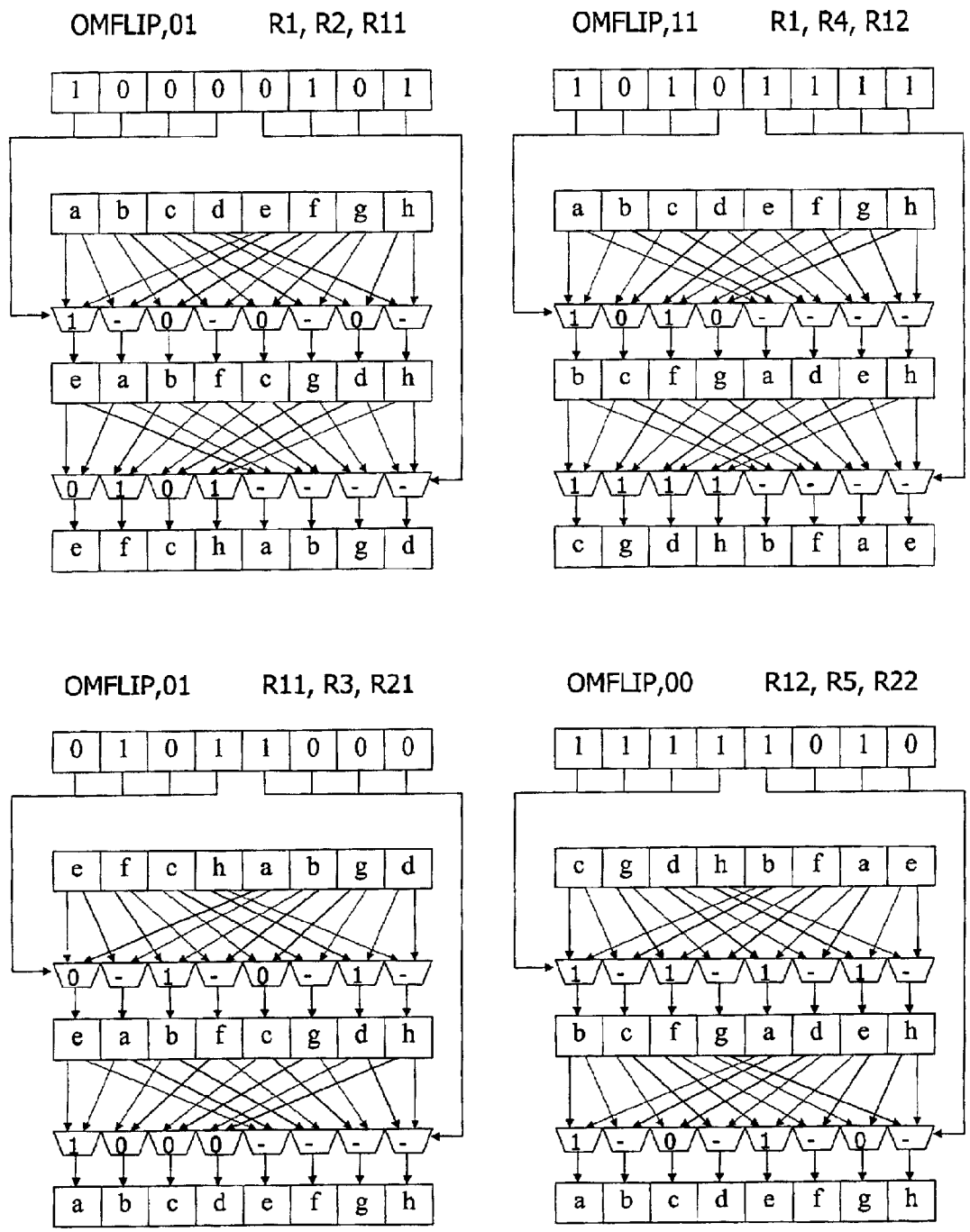
FIG. 13 is a diagram illustrating two examples of reversing OMFLIP instructions.

Another example is illustrated by the two diagrams on the right half of FIG. 13. OMFLIP, 11, R1, R4, R12, where R4=10101111, can be reversed by doing OMFLIP, 00 R12, R5, R22, where R5=11111010. The permutation:

OMFLIP, 11 R1, R4, R12; R4=10101111 can be decomposed into 2 stages:

Flip R1, 1010, TEMP1

Flip TEMP1, 1111, R12

To reverse this OMFLIP instruction, the result in register R12 is permuted back into the original value in register R1. To do this, the order of the stages are first reversed (starting with the contents of register R12 as the source bits):

Flip R12, 1111, TEMP2

Flip TEMP2, 1010, R22

Then, an omega stage is changed to a flip stage and a flip stage to an omega stage:

Omega R12, 1111, TEMP2

Omega TEMP2, 1010, R22

This is encoded into one OMFLIP instruction as follows:

OMFLIP, 00 R12, R5, R22; R4=11111010

Reversing a permutation obtained by a sequence of OMFLIP instructions is achieved by reversing the order of the instructions performed, and then reversing each OMFLIP instruction as just described.

It is understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

What is claimed is:

1. A method of performing an arbitrary permutation of a source sequence of bits in a programmable processor comprising the steps of:
   a. defining an intermediate sequence of bits that said source sequence of bits is transformed into;
   b. determining a permutation instruction for transforming said source sequence of bits into said intermediate sequence of bits; and
   c. repeating steps a. and b. using said determined intermediate sequence of bits from step b. as said source sequence of bits in step a. until a desired sequence of bits is obtained,
   wherein the determined permutation instructions form a permutation instruction sequence.

2. The method of claim 1 wherein said intermediate sequence of bits is determined with a configuration of a multistage interconnection network.

3. The method of claim 1 wherein said intermediate sequence of bits is determined with a configuration of an omega-flip network, said omega-flip network comprising at least two stages wherein each said stage is either an omega network stage or a flip network stage.

4. The method of claim 3 wherein the permutation instruction comprises an opcode indicating the configuration of said omega-flip network, a reference to a source register which contains said source sequence of bits, a reference to one or more configuration registers which contain configuration bits, and optionally a reference to a destination register to which said intermediate sequence of bits or said desired sequence of bits is placed.

5. The method of claim 4 where said opcode comprises a plurality of bits, with a first bit for indicating if a first said stage is said omega network or said flip network stage and a second bit for indicating if a second said stage is said omega network or said flip network stage.

6. The method of claim 4 wherein said opcode comprises a plurality of bits with each said bit indicating if said stage is said omega network or said flip network.

7. The method of claim 3 wherein the permutation instruction comprises an opcode indicating the configuration of said omega-flip network, a reference to a source register which contains said source sequence of bits, and a reference to one or more configuration registers which contain configuration bits, and optionally a reference to a destination register to which said intermediate sequence of bits or said desired sequence of bits is placed wherein each said configuration of said omega-flip network has at least two said stages, wherein each said stage uses configuration bits from one of said configuration registers.

8. The method of claim 7 wherein a first set of said configuration bits determines movement of said source sequence of bits in said source register to said intermediate sequence of bits and a second set of said configuration bits determines movement of said intermediate sequence of bits into said destination register.

9. The method of claim 7 wherein each of said configuration bits is applied to a pair of conflict outputs of said omega-flip network.

10. The method according to claim 7 wherein said permutation instruction comprises a reference to two configuration registers, and said omega-flip network comprises four stages.

11. The method of claim 1 wherein said intermediate sequence of bits is determined with a configuration of an omega-flip network, said omega flip network comprising a first omega stage connected to a first flip stage, said first flip stage connected to a second flip stage and a said second flip stage connected to a second omega stage wherein said permutation instruction uses two stages selected from the group consisting of said first omega stage, said first flip stage, said second omega stage, said second flip stage and two unselected stages are configured as pass through stages.

12. The method of claim 1 wherein said intermediate sequence of bits is determined with a configuration of a modified omega-flip network, said modified omega flip network comprising a first modified omega stage connected to a first modified flip stage, said first modified flip stage connected to a second modified flip stage and a said second modified flip stage connected to a second modified omega stage wherein said modified omega stage is an omega stage with pass throughs and said modified flip stage is a flip stage with pass throughs.

13. The method of claim 3 wherein said configuration of an omega-flip network is determined by the steps of:
    determining a configuration of a Benes network for said permutation; and
    translating said configuration of a Benes network into said configuration of an omega-flip network.

14. The method of claim 13 wherein said permutation instruction is assigned to two or more stages of said omega-flip network.

15. The method of claim 3 wherein at most 21 gr/m said permutation instructions are included in said permutation instruction sequence, wherein r is the number of subwords in said sequence of bits, each said subword comprising one or more bits, and m is the number of network stages performed by one permutation instruction.

16. The method of claim 1 wherein said programmable processor is a microprocessor, digital signal processor, media processor, multimedia processor, cryptographic processor, or programmable System-on-a-Chip (SOC).

17. The method of claim 3 wherein said source sequence of bits is formed in subwords of two or more of said bits and further comprising the steps of:
    after step c, determining pass through stages in said omega-flip network; and
    eliminating said pass through stages.

18. The method of claim 3 wherein said permutation is reversed by the steps of:
    reversing an order of said permutation instructions in said permutation instruction sequence;
    reversing an order of each of said omega network stages and said flip network stages in said omega-flip network in each said permutation instruction; and
    changing each of said omega network stages to said flip network stages and each of said flip network stages to said omega network stages.

19. The method of claim 1 wherein configuration bits are used in said permutation instruction for determining movement of said source sequence of bits in a source register to said intermediate sequence of bits or movement of said intermediate sequence of bits into a destination register or a second intermediate sequence of bits and further comprising the steps of storing said configuration bits and retrieving said stored configuration bits during step b.

20. The method of claim 1 wherein configuration bits are used in said permutation instruction for determining movement of said source sequence of bits in said source register to said intermediate sequence of bits or movement of said intermediate sequence of bits into said destination register or said source register and further comprising the steps of storing a portion of said configuration bits and retrieving said stored portion of configuration bits during step b.

21. A method of performing an arbitrary permutation of a source sequence of bits in a programmable processor said source sequence of bits is packed into a plurality of source registers comprising the steps of:
 a. dividing bits of a first of said source registers to be placed in a first destination register into a first group and bits of said first of said source registers to be placed in a second destination register into a second group with a first permutation instruction sequence;
 b. dividing bits of a second of said source registers to be placed in said first destination register into a first group and bits of said second of said source registers to be placed in a second destination register into a second group with a second permutation instruction sequence;
 c. placing bits of said first group of said first of said source registers and said bits of said first group of said second of said source registers into said first destination register;
 d. placing bits of said second group of said first of said source registers and said second group of said second of said registers into said second destination register;
 e. defining a sequence of bits of said first destination register as a first source sequence of bits and a sequence of bits of said second destination register as a second source sequence of bits;
 f. defining an intermediate sequence of bits that each of said first source sequence of bits and said second source sequence of bits is transformed into;
 g. determining a permutation instruction for transforming said first source sequence of bits and said second source sequence of bits into respective said intermediate sequence of bits; and
 repeating steps f. and g. using said determined intermediate sequence of bits from step g. as said source sequence of bits in step f. until a respective desired sequence of bits is obtained for said first source sequence of bits and said second source sequence of bits,
 wherein the determined permutation instructions form a permutation instruction sequence.

22. The method of claim 21 wherein said programmable processor is a microprocessor, digital signal processor, media processor, multimedia processor, cryptographic processor, or programmable System-on-a-Chip (SOC).

23. The method of claim 18 wherein at most 41 gn+2 instructions are included in said permutation instruction sequence, wherein n is the number of subwords in said sequence of bits, each said subword comprising one or more bits.

24. A method of performing an arbitrary permutation of a source sequence of bits in a programmable processor comprising the steps of:
 a. defining an intermediate sequence of bits that said source sequence of bits is transformed into with a configuration of an omega-flip network, said omega-flip network comprising at least two stages, each said stage is either an omega network stage or a flip network stage;
 b. determining a permutation instruction for transforming said source sequence of bits into said intermediate sequence of bits;
 c. storing said determined intermediate sequence of bits; and
 d. determining a subsequent permutation instruction using said stored intermediate sequence of bits.

25. The method of claim 24 further comprising repeating step c. and step d. until a desired sequence of bits is obtained, wherein the determined permutation instructions form a permutation instruction sequence.

26. The method of claim 25 wherein configuration bits are used in said permutation instruction for determining movement of said source sequence of bits in said source register to said intermediate sequence of bits or movement of said intermediate sequence of bits into a destination register or a second intermediate sequence of bits and two configuration registers are used for storing said configuration bits.

27. A method for performing a permutation of a source sequence of bits in a programmable processor comprising the steps of:
 defining an intermediate sequence of bits that said source sequence of bits is transferred into using an interconnection network; and
 determining a sequence of one or more permutation instructions for transferring said source sequence of bits into said intermediate sequence of bits and optionally one or more subsequent intermediate sequences of bits until a desired sequence of bits is obtained.

28. A method for performing a permutation of a source sequence of bits in a programmable processor comprising the steps of:
 defining an intermediate sequence of bits that said source sequence of bits is transferred into using an omega-flip network; and
 determining a sequence of one or more permutation instructions for transferring said source sequence of bits into said intermediate sequence of bits and optionally one or more subsequent intermediate sequences of bits until a desired sequence of bits is obtained.

29. The method of claim 28 wherein said intermediate sequence of bits is determined with a configuration of an omega-flip network, said omega-flip network comprising at least two stages wherein each said stage is either an omega network stage or a flip network stage.

30. The method of claim 29 wherein at most 2⌈lgr/m⌉ said permutation instructions are included in said permutation instruction sequence, wherein r is the number of subwords in said sequence of bits, each said subword comprising one or more bits, and m is the number of network stages performed by one permutation instruction.

31. A system of performing an arbitrary permutation of a source sequence of bits in a programmable processor comprising:
 means for defining an intermediate sequence of bits that said source sequence of bits is transformed into using omega network stages and flip network stages; and
 means for determining a permutation instruction for transforming said source sequence of bits into one or more intermediate sequence of bits until a desired sequence of bits is obtained, wherein each intermediate sequence of bits is used as input to the subsequent permutation instruction and the determined permutation instructions form a permutation instruction sequence.

32. The system of claim 31 wherein the omega-flip network at least two stages wherein each stage is either said omega network stage or said flip network stage.

33. The system of claim 32 wherein the permutation instruction comprises an opcode indicating which two stages of said omega-flip network are used in said permutation instruction, a reference to a source register which contains said source sequence of bits, a reference to at least one configuration register which contains configuration bits.

34. The system of claim 33 wherein said permutation instruction further comprises a reference to a destination register to which said intermediate sequence of bits or said desired sequence of bits is placed.

35. The system of claim 33 wherein said opcode comprises a first bit for indicating if said omega network stage or said flip network stage is used in a first stage of said omega-flip network and a second bit for indicating if said omega network stage or said flip network stage is used in a second stage of said omega-flip network.

36. The system of claim 33 wherein a first set of said configuration bits determines movement of said source sequence of bits in said source register to said intermediate sequence of bits and a second set of configuration bits determines movement of said intermediate sequence of bits into said destination register or a second intermediate sequence of bits.

37. The system of claim 33 wherein said opcode comprises a plurality of bits with each said bit indicating if said stage is said omega network or said flip network.

38. The system of claim 33 wherein each of said configuration bits is applied to a pair of conflict outputs of said omega-flip network.

39. The system according to claim 33 wherein said permutation instruction comprises a reference to two configuration registers, and said omega-flip network comprises four stages.

40. The system of claim 31 wherein said omega flip network comprises a first said omega network stage connected to first said flip network stage, said first flip network stage connected to a second flip network stage and a said second flip network stage connected to a second omega network stage wherein said permutation instruction uses two stages selected from the group consisting of said first omega network stage, said first flip network stage, said second omega network stage, said second flip network stage and two unselected stages are configured as pass through stages.

41. The system of claim 31 wherein said intermediate sequence of bits is determined with a configuration of a modified said omega-flip network, said modified omega flip network comprising a first modified omega stage connected to a first modified flip stage, said first modified flip stage connected to a second modified flip stage and a said modified second flip stage connected to a second modified omega stage wherein said modified omega stage is said omega stage with pass throughs and said modified flip stage is said flip stage with pass throughs.

42. The system of claim 31 wherein a configuration of an omega-flip network is determined by:
means for determining configuration of a Benes network for said permutation; and
means for translating said configuration of a Benes network into said configuration of an omega-flip network.

43. The system of claim 42 wherein said permutation instruction is assigned to a pair of stages of said omega-flip network.

44. The system of claim 31 wherein at most 21 gr/m said permutation instructions are included in said permutation instruction sequence, wherein r is the number of subwords in said sequence of subwords in said sequence of bits, each said subword comprising one or more bits, and m is the number of network stages performed by one permutation instruction.

45. The system of claim 31 wherein said programmable processor is a microprocessor, digital signal processor, media processor, multimedia processor, cryptographic processor, or programmable System-on-a-Chip (SOC).

46. The system of claim 31 wherein said source sequence of bits is formed in subwords of two or more of said bits and further comprising:
means for determining pass through stages in said omega-flip network; and
means for eliminating said pass through stages.

47. The system of claim 31 further comprising:
means for reversing an order of said permutation instructions in said permutation instruction sequence;
means for reversing an order of each of said stages in said omega-flip network in each said permutation instruction; and
means for changing each of said omega stages to said flip stages and each of said flip stages to said omega stages wherein said permutation is reversed.

48. The system of claim 31 wherein configuration bits are used in said permutation instruction for determining movement of said source sequence of bits in said source register to said intermediate sequence of bits or movement of said intermediate sequence of bits into a destination register or a source register and further comprising means for storing said configuration bits and means for retrieving said stored configuration bits for use in said permutation instruction.

49. The system of claim 31 wherein configuration bits are used in said permutation instruction for determining movement of said source sequence of bits in said source register to said intermediate sequence of bits or movement of said intermediate sequence of bits into said destination register or said source register and further comprising means for storing a portion of said configuration bits and retrieving said stored portion of configuration bits for use in said permutation instruction.

50. A system of performing an arbitrary permutation of a source sequence of bits in a programmable processor said source sequence of bits is packed into a plurality of source registers comprising:
means for dividing bits of a first of said source registers to be placed in a first destination register into a first group and bits of said first of said source registers to be placed in a second destination register into a second group with one said permutation instruction sequence;
means for dividing bits of a second of said source registers going to said first destination register into a first group and bits of a second of said source registers going to a second destination register into a second group with one said permutation instruction sequence;
means for placing bits of said first group of said first of said source registers and said bits of said first group of said second of said source registers into said first destination register;
means for placing bits of said second group of said first of said source registers and said second group of said second of said source registers into said second destination register;

means for defining a sequence of bits of said first destination register, as a first source sequence of bits and a sequence of bits of said second destination register as a second source sequence of bits;

means for defining an intermediate sequence of bits that each of said first source sequence of bits and said second source sequence of bits is transformed into; and means for determining a permutation instruction for transforming said first source sequence of bits and said second source sequence of bits into one or more respective said intermediate sequence of bits until a respective desired sequence of bits is obtained for said first source sequence of bits and said second source sequence of bits, wherein each intermediate sequence of bits is used as input to the subsequent permutation instruction and the determined permutation instructions form a permutation instruction sequence.

51. The system of claim 50 wherein at most 41 gn+2 instructions are included in said permutation instruction sequence, wherein n is the number of subwords in said sequence of bits, each said subword comprising one or more bits.

52. A system for performing an arbitrary permutation of a source sequence of bits in a programmable processor comprising:
   a. means for defining an intermediate sequence of bits that said source sequence of bits is transformed into with a configuration of an omega-flip network, said omega-flip network comprising at least two stages, each said stage is either an omega network stage or a flip network stage;
   b. means for determining a permutation instruction for transforming said source sequence of bits into said intermediate sequence of bits;
   c. means for storing said determined intermediate sequence of bits; and
   d. means for determining a subsequent permutation instruction using said stored intermediate sequence of bits.

53. The system of claim 52 further comprising means for repeating c. and d. until a desired sequence of bits is obtained,
   wherein the determined permutation instructions form a permutation instruction sequence.

54. The system of claim 52 wherein configuration bits are used in said permutation instruction for determining movement of said source sequence of bits in said source register to said intermediate sequence of bits or movement of said intermediate sequence of bits into a destination register or a source register and two configuration registers are used for storing said configuration bits.

55. A system for performing a permutation of a source sequence of bits in a programmable processor comprising:
   means for defining an intermediate sequence of bits that said source sequence of bits is transformed into using an interconnection network, and
   means for determining a sequence of permutation operations for transforming said source sequence of bits into one or more intermediate sequence of bits until a desired sequence of bits is obtained.

56. A system for performing a permutation of a source sequence of bits in a programmable processor comprising:

means for defining an intermediate sequence of bits that said source sequence of bits is transformed into using omega and flip network stages; and means for determining a sequence of permutation operations for transforming said source sequence of bits into one or more intermediate sequence of bits until a desired sequence of bits is obtained.

57. The system of claim 56 wherein said intermediate sequence of bits is determined with a configuration of an omega-flip network, said omega-flip network comprising at least two stages wherein each said stage is either an omega network stage or a flip network stage.

58. The system of claim 56 wherein at most 21 gr/m said permutation instructions are included in said permutation instruction sequence, wherein r is the number of subwords in said sequence of bits, each said subword comprising one or more bits, and m is the number of network stages performed by one permutation instruction.

59. A computer implemented method for performing an arbitrary permutation of a sequence of bits comprising the steps of:
   inputting said sequence of bits into a source register;
   connecting said source register to an omega-flip network;
   in response to an omega-flip instruction selecting a configuration of said omega-flip network; and
   moving each of said bits in said source register to a position in a sequence of bits of a destination register based on configuration bits of a configuration register.

60. The method of claim 59 wherein at most 21 gr/m said permutation instructions are included in said permutation instruction sequence, wherein r is the number of subwords in said sequence of subwords in said sequence of bits, each said subword comprising one or more bits, and m is the number of network stages performed by one permutation instruction.

61. A computer system for performing an arbitrary permutation comprising:
   a source register;
   a configuration register;
   a destination register;
   an omega-flip network coupled to said first source register, said configuration register and said destination register, in response to an omega-flip instruction selecting a configuration of said omega-flip network, placing each bit in said sequence of bits from said source register to a position in a sequence of bits in said destination register based on a configuration of bits of said configuration register.

62. The system of claim 61 wherein at most 21 gr/m said permutation instructions are included in said permutation instruction sequence, wherein r is the number of subwords in said sequence of subwords in said sequence of bits, each said subword comprising one or more bits, and m is the number of network stages performed by one permutation instruction.

63. A computer readable medium having stored thereon data representing a sequence of permutation instructions, the sequence of permutation instructions which when executed by a processor, cause the processor to permute a source sequence of subwords into one or more intermediate sequences of subwords, each intermediate sequence of subwords using input from said source sequence of subwords or a previous said intermediate sequence of subwords until a desired sequence of subwords is obtained, wherein each subword is one or more bits, said intermediate sequence being determined using a multistage interconnection network.

64. A computer readable medium having stored thereon data representing a sequence of permutation instructions, the sequence of permutation instructions which when executed by a processor, cause the processor to permute a source sequence of subwords into one or more intermediate sequences of subwords, each intermediate sequence of subwords using input from said source sequence of subwords or a previous said intermediate sequence of subwords until a desired sequence of subwords is obtained, wherein each subword is one or more bits, said intermediate sequence being determined using an omega and flip network stages.

65. The computer readable medium of claim 64 wherein said omega-flip network comprises at least two stages wherein each stage is either an omega network stage or a flip network stage.

66. The computer readable medium of claim 64 wherein at most 21 gr/m said permutation instructions are included in said permutation instruction sequence, wherein r is the number of subwords in said sequence of subwords in said sequence of bits, each said subword comprising one or more bits, and m is the number of network stages performed by one permutation instruction.

67. A cryptographic system, having stored thereon data representing a sequence of permutation instructions, the sequence of permutation instructions which when executed by a processor, cause the processor to permute a source sequence of subwords into one or more intermediate sequences of subwords, each intermediate sequence of subwords using input from said source sequence of subwords or a previous said intermediate sequence of subwords until a desired sequence of subwords is obtained, wherein each subword is one or more bits, said intermediate sequence being determined using a multistage interconnection network.

68. A cryptographic system, having stored thereon data representing a sequence of permutation instructions, the sequence of permutation instructions which when executed by a processor, cause the processor to permute a source sequence of subwords into one or more intermediate sequences of subwords, each intermediate sequence of subwords using input from said source sequence of subwords or a previous said intermediate sequence of subwords until a desired sequence of subwords is obtained, wherein each subword is one or more bits, said intermediate sequence being determined using an omega and flip network stages.

69. The cryptographic system of claim 68 wherein the omega-flip network comprises at least two stages wherein each stage is either an omega network stage or a flip network stage.

70. The cryptographic system of claim 68 wherein at most 21 gr/m said permutation instructions are included in said permutation instruction sequence, wherein r is the number of subwords in said sequence of subwords in said sequence of bits, each said subword comprising one or more bits, and m is the number of network stages performed by one permutation instruction.

* * * * *